(12) United States Patent
Otsuka et al.

(10) Patent No.: US 6,201,771 B1
(45) Date of Patent: Mar. 13, 2001

(54) CONTENT PROVIDING SYSTEM

(75) Inventors: Satoshi Otsuka; Kazuyuki Marukawa, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/330,892

(22) Filed: Jun. 11, 1999

(30) Foreign Application Priority Data

Jun. 24, 1998 (JP) .................................................. 10-177791

(51) Int. Cl.[7] .................................................. G11B 17/22
(52) U.S. Cl. .................................................. 369/30
(58) Field of Search .................................. 309/30, 32, 34, 309/33, 47, 48, 54, 58; 375/220; 705/53, 52, 17, 1, 28; 709/202, 203; 369/29, 24

(56) References Cited

U.S. PATENT DOCUMENTS

| | | | |
|---|---|---|---|
| 4,558,176 | 12/1985 | Arnold et al. | 178/22.08 |
| 4,975,898 | 12/1990 | Yoshida | 369/100 |
| 5,182,770 | 1/1993 | Medveczky et al. | 380/4 |
| 5,295,126 | 3/1994 | Okano et al. | 369/47 |
| 5,319,627 | 6/1994 | Shinno et al. | 369/54 |
| 5,363,352 | 11/1994 | Tobita et al. | 369/13 |
| 5,436,770 | 7/1995 | Muto et al. | 360/51 |
| 5,461,220 | 10/1995 | Ogino | 235/454 |
| 5,541,903 | 7/1996 | Funahashi et al. | 369/54 |
| 5,592,452 | 1/1997 | Yoshimoto et al. | 369/58 |
| 5,592,511 | 1/1997 | Schoen et al. | 375/220 |
| 5,687,397 | 11/1997 | Ohmori | 395/893 |
| 5,761,301 | 6/1998 | Oshima et al. | 380/4 |
| 5,805,551 | 9/1998 | Oshima et al. | 369/59 |

FOREIGN PATENT DOCUMENTS

| | | |
|---|---|---|
| 0 715 245 A1 | 6/1996 | (EP) . |
| 0 632 397 A2 | 7/1997 | (EP) . |
| 0 898 278 A2 | 2/1999 | (EP) . |
| 63-20769 | 1/1988 | (JP) . |
| 63-261578 | 10/1988 | (JP) . |
| 64-14776 | 1/1989 | (JP) . |
| 7-64841 | 1/1989 | (JP) . |
| 3-256225 | 11/1991 | (JP) . |
| 6-314174 | 11/1994 | (JP) . |
| 6-332762 | 12/1994 | (JP) . |
| 7-57263 | 3/1995 | (JP) . |

*Primary Examiner*—Tan Dinh
(74) *Attorney, Agent, or Firm*—Limbach & Limbach L.L.P.; Seong-Kun Oh

(57) ABSTRACT

There is provided a content providing system in which many unspecified many people can arbitrarily use it to get (purchase) a recording medium in which desired content has been downloaded, and the recording medium itself can be effectively used. Some download data (content) are selected and set on the basis of exhibit information detected from a recording medium, and operation control is made so that the recording medium in which the download data are recorded is ejected. That is, the recording medium which records content desired by a user can be provided to the user in any one mode of returning, exchange, and selling.

9 Claims, 20 Drawing Sheets

CONTENT PROVIDING SYSTEM

BACKGROUND OF THE INVENTION

1. Field of the Invention

The present invention relates to an information providing apparatus in which many unspecified people can arbitrarily use it to obtain various kinds of information with a fee or without a fee.

2. Description of the Related Art

In recent years, various kinds of information have been provided in electronic information mode in which they are recorded in a medium.

For example, a newspaper, a magazine, a novel, and the like are recorded in CD-ROMs or the like as electronic publications and are on sale. The same is applied to music, video (movie, video clip, etc.), game software, application software used in a personal computer, and the like, and various kinds of information (hereinafter, information recorded in a medium and provided will be referred to as "content" in the present specification) are provided with a fee or without a fee in an extremely wide range.

In the content which is provided in electronic form, there are content which a user keeps for a long period (music software, application software, etc.) and content which the user feels that long storage is unnecessary.

For example, when it is considered that a newspaper or a weekly magazine is provided in electronic form, if the user sees the information once, it often becomes unnecessary thereafter.

In other words, it is not realistic to sell a newspaper or a magazine, as a package medium, in a maintainable recording medium of a disk or card. For example, if the user sees the contents once, not only the information but also the medium itself becomes unnecessary, so that useless consumption of resources is caused.

On the other hand, with respect to the information which does not require long storage, it is also carried out for a user to search or download arbitrarily from his own terminal (personal computer, etc.) through communication such as the Internet. However, in this case, in order to see the contents of the information, the user must be in a place (home, office, etc.) where the terminal is set. For example, in the case where the user desires to see the contents of the information at an arbitrary place through a portable disk reproducing apparatus or the like, it is necessary to further download the information from the terminal to a disk medium or the like.

Besides, in order to obtain content such as an electrical newspaper through communication, it is naturally necessary for the user to have the terminal connected to a communication network.

From the above circumstances, it has been required to realize such that a general user can easily obtain a medium on which are recorded content such as an electronic newspaper or magazine, and the user can confirm the content at an arbitrary place by using, for example, a portable reproducing apparatus or a home terminal, and further, waste of the medium itself does not occur.

Besides, when considering an apparatus in which a general user can obtain a medium which records content, it is also required that inventory control can be simply made.

SUMMARY OF THE INVENTION

In view of the foregoing circumstances, an object of the present invention is to provide a content providing system in which many unspecified people arbitrarily use it to obtain (purchase) a recording medium in which desired content has been downloaded, and the recording medium itself can be effectively used, and further, inventory control of the recording medium recording the content to be sold can be made simple and adequate.

According to an aspect of the invention, an information providing apparatus comprises: a loading section in which a recording medium including use state identification information indicating one of a personal use and an unspecified user's use is loaded; recording means for recording content information in the recording medium loaded in the loading section; use state detecting means for detecting which of the personal use and the unspecified user's use the use state identification information of the recording medium loaded in the loading section indicates; ejecting means for ejecting the recording medium to an outside of the apparatus; content detecting means for detecting a kind of content information to be recorded in the recording medium ejected by the ejecting means; a housing section capable of housing a recording medium in which one of various kinds of content information is recorded in advance; and control means, wherein when the use state detecting means detects that the use state identification information of the recording medium indicates the personal use, the control means controls the recording means so that the content information of the kind detected by the content detecting means is recorded in the recording medium loaded in the loading section, and then, the control means controls the ejecting means so that the recording medium loaded in the loading section is ejected; and when the use state detecting means detects that the use state identification information of the recording medium indicates the unspecified user's use, the control means controls the ejecting means so that the recording medium in which the content information of the kind detected by the content detecting means is recorded is ejected among recording media housed in the housing section.

According to another aspect of the invention, an information providing apparatus comprises: a housing section capable of housing a plurality of recording media in which any one of plural kinds of contents information is recorded in advance; content detecting means for detecting a kind of content information required by a user; ejecting means for ejecting a recording medium in which the content information of the kind detected by the content detecting means among recording media housed in the housing section; remaining recording medium detecting means for detecting whether or not the remaining number of the recording media which are housed in the housing section and in which each kind of content information is recorded, is a minimum threshold value or less; and replenishing means for replenishing the recording medium in which the content information of the kind detected by the remaining recording medium detecting means such that the remaining number is the minimum threshold value or less.

According to further aspect of the invention, an information providing apparatus comprises: a loading section in which a recording medium is loaded; content identification information detecting means for detecting content identification information of the recording medium loaded in the loading section; setting means for setting content information on the basis of the content identification information detected by the content identification information detecting means; housing section capable of housing a plurality of recording media in which content information indicated by the content identification information is recorded in advance; and ejecting means for ejecting, among recording media housed in the housing section, a recording medium in which the content information coincident with the content information set by the setting means is recorded.

According to still further aspect of the invention, a recording medium which loaded in an information providing apparatus in a removable manner and in which content information can be recorded by the information providing apparatus, wherein the recording medium comprises: a recording medium main body; and a content identification section including content identification information indicating a kind of content information which can be detected by the information providing apparatus.

According to still another aspect of the invention, a method of providing content comprises the steps of: detecting which of a personal use and an unspecified user's use is indicated by use state identification information of a recording medium loaded in a loading section; detecting a kind of content information to be recorded in a recording medium ejected by ejecting means; wherein when it is detected in the step of detecting a use state that the use state identification information of the recording medium indicates the personal use, recording the content information of the kind detected in the step of detecting the kind of the content information in the recording medium loaded in the loading section, and then, controlling the ejecting means so that the recording medium loaded in the loading section is ejected; and when it is detected in the step of detecting the use state that the use state identification information of the recording medium indicates the unspecified user's use, controlling the ejecting means so that, among recording media housed in a housing section capable of housing recording media in which any one of various kinds of content information is recorded in advance, the recording medium in which the content information of the same kind as the kind detected in the step of detecting the kind of the content information is recorded, is ejected.

According to still another aspect of the invention, a method of providing content comprises: step (a) of detecting a kind of content information required by a user; step (b) of ejecting a recording medium in which the content information of the kind detected in the step (b) is recorded, among recording media housed in a housing section capable of housing a plurality of recording media in which any one of various kinds of content information is recorded in advance; step (c) of detecting whether or not the remaining number of recording media which are housed in the housing section and in which each kind of content information is recorded is a minimum threshold value or less; and step (d) of replenishing the recording medium in which the content information of the kind which has been detected in the step (c) that the remaining number is the minimum threshold value or less, is recorded.

According to still another aspect of the invention, a method of providing content comprises the steps of: detecting content identification information of a recording medium loaded in a loading section; setting content information on the basis of the content identification information detected by the step of detecting the content identification information; and ejecting a recording medium in which content information coincident with the content information set at the setting step is recorded, among recording media housed in a housing section capable of housing a plurality of recording media in which the content information indicated by the content identification information is recorded in advance.

DETAILED DESCRIPTION OF THE PREFERRED EMBODIMENTS

Figure 1:
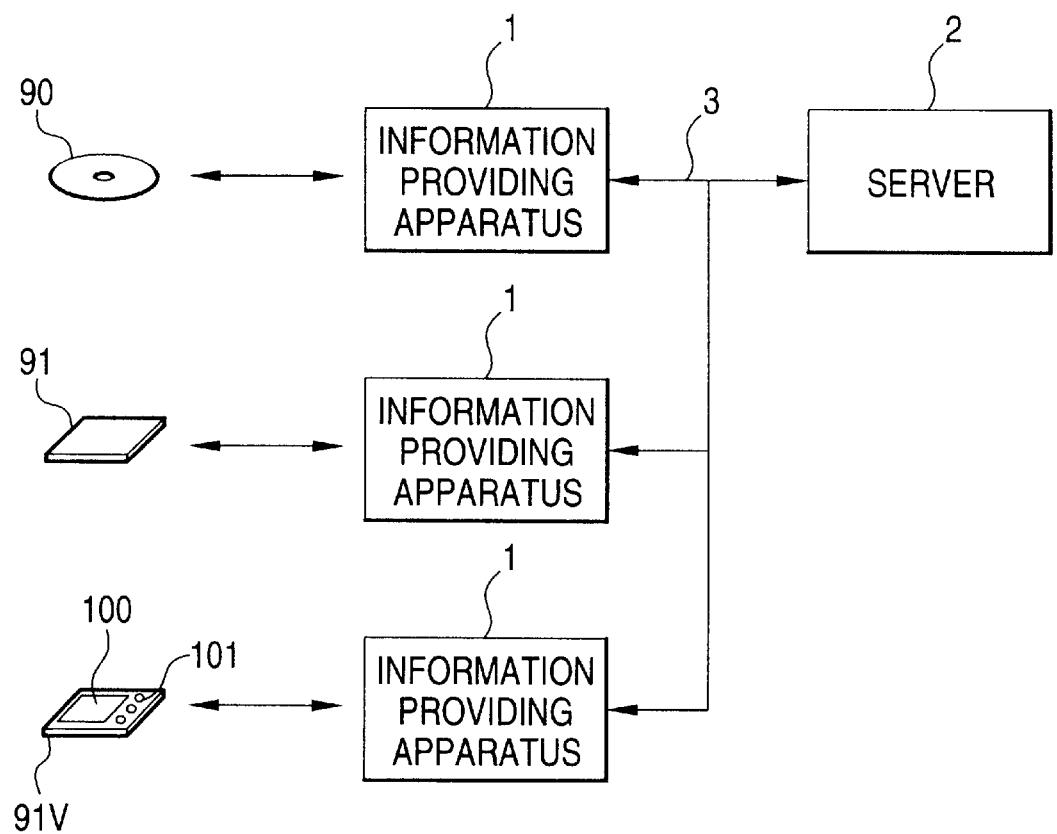
FIG. 1 is an explanatory view of a system structure of an embodiment of the present invention.

An information providing apparatus and a recording medium of one embodiment of the present invention will be described in the following order.

1. System mode
2. Medium
3. Structure of a disk adaptive type information providing apparatus 4. Use procedure to a disk adaptive type information providing apparatus
5. Processing of a disk adaptive type information providing apparatus
6. Structure of an IC card adaptive type information providing apparatus
7. Use procedure to an IC card adaptive type information providing apparatus
8. Processing of an IC card adaptive type information providing apparatus
9. Inventory adjustment processing
10. Modified example 1. System mode An example of a system mode of one embodiment of the present invention will be described with reference to FIG. 1.

As shown in FIG. 1, the system of this embodiment is structured such that a plurality of information providing apparatuses 1 and a server 2 are connected to each other through a communication line 3.

The communication line 3 may be a communication network structured for the system, for example, as a LAN (Local Area Network), or may be a general public telephone line network. A wireless communication line such as satellite communication means may also be used.

The information providing apparatus 1 is disposed at a place where some unspecified people can use, such as a store, a station, a school, a company.

As described later, each user can download desired content into a disk 90 or an IC card 91 as a removable recording medium by using the information providing apparatus. Incidentally, as an example of the recording medium, it is conceivable to use, for example, an IC card 91V with a viewer in which a display function is provided in the IC card itself.

When the user downloads the content of an electronic newspaper, an electronic magazine, and the like into the disk 90 or the IC card 91, the user can see and listen to the content through the user's own personal computer or portable reproducing apparatus.

Considering the use of the IC card 91V with the viewer, when the user downloads the content such as an electronic newspaper and an electronic magazine, he or she can display the contents on, for example, a display portion 100 by operating an operation portion 101 if only having the IC card 91V with the viewer. Of course, if the IC card 91V with the viewer is further equipped with a voice reproducing function, the user can see and listen to the content including voice data as well.

That is, the information providing apparatus has a function as a vending machine of information (content).

Incidentally, the kind of a recording medium used for downloading of information is not limited. For example, when the disk 90 and the IC card 91 (91V) are cited as examples, as the information providing apparatus 1, an information providing apparatus corresponding to the disk 90, and an information providing apparatus corresponding to the IC card 91 (91V) are provided, respectively.

Moreover, for example, as a recording medium, there are a personal medium which a user personally purchases and owns, and a common medium which many people use through the information providing apparatus 1 (for example, the medium itself is put in a mode of a rental).

In this embodiment, description will be made on the assumption that as an example, with respect to the disk 90, a personal disk and a common disk are prepared, while with respect to the IC card 91 (91V), only a personal IC card is used.

However, of course, it is also conceivable that a common IC card is made to be used, or such a system structure that only a personal disk or only a common disk is used is adopted.

The server 2 carries out management of the information providing apparatuses 1 set at various places, provision of content prepared for the information providing apparatuses 1, fee collecting management to the use of a user, and so on.

For example, with respect to information which the user downloads by using the information providing apparatus 1 and which requires update, the server 2 periodically or irregularly supplies update data through the communication line 3, and causes at the side of the information providing apparatus 1 to execute the update.

For example, in the case where a daily electronic newspaper or the like is considered and a user is enabled to download information as the electronic newspaper into the disk 90 every day (or at a desired time), for example, each time the electronic newspaper is issued, electronic newspaper data of new contents is transmitted to the respective information providing apparatus 1 and update is made. By causing such update to be executed, it is possible to provide the newest data for download to a number of information providing apparatuses 1 instantaneously and to the respective information providing apparatuses 1 without getting assistance from somebody.

Incidentally, not only are the update is made through such communication line 3, but also the update may be made such that update data are distributed through, for example, a disk, and a person in charge at the place where each of the information providing apparatuses 1 is set (a clerk in the store, etc.) loads the information providing apparatus 1 with the distributed disk, so that the contents of the download data are renewed.

Various kinds of fee payment modes when the user uses the information providing apparatus 1 are conceivable as follows:

First, it is possible to provide the use of the information providing apparatus 1 to the public (or only people in some organization) without charge. As the case of free provision, such an example is conceivable that several information providing apparatuses 1 are disposed in a school, and the students and the staff of the school can freely use the information providing apparatus 1 to downloading the desired content.

In the case of charging a fee, it is possible to consider payment by charging a credit card (bank account, etc.) through payment registration of a user to the server 2, payment by money or a prepaid card, payment by insertion of a credit card, and so on.

With respect to credit card payment through the payment registration, for example, the server 2 manages.

When purchasing the personal disk 90 or the personal IC card 91 (91V), the user makes a registration procedure that he or she uses the disk to use the information providing apparatus 1 and pays by credit card.

When the server 2 receives the registration procedure, the user can use the information providing apparatus 1 thereafter by using the disk 90 or the IC card 91 (91V) even if he or she does not have money or a prepaid card.

In this case, when the user uses the information providing apparatus 1, a strict check (identification check) is made for the loaded medium and the user by both the information providing apparatus 1 and the server 2. If the check is OK, the use becomes possible.

With respect to this check, a serial number of the medium, a user ID, a password, and the like are used.

In the case where payment is made by money (coin or paper money) or a prepaid card, the information providing apparatus 1 carries out a fee collecting processing to the inserted coin or prepaid card.

Moreover, as a fee payment mode, like an example of a public telephone recently installed, such a system is also conceivable that a credit card is directly inserted into the information providing apparatus 1 and is used. Of course, in this case, the information providing apparatus 1 must have a processing function for a credit card.

Incidentally, a use fee to be charged is an information fee of content downloaded by using the information providing apparatus 1.

As to a fee relating to a recording medium, in the case of a personal medium, the fee is paid when it is purchased, and is not charged at the time of using the information providing apparatus.

In the case of a common medium, for example, when a user first uses it, the fee is charged in the form of some compensation. At the time of the next use, as described later, the medium is exchanged, so that it is conceivable that the fee of the medium itself is not charged. Besides, such a system may be adopted such that all or part of the compensation is paid back to the user by returning the medium.

That is, when the user downloads information in this system, fees to be charged can be made almost only fees of information as content, and it is also possible to set a fee at a low price.

The structural elements of the system as in FIG. 1 and the fee payment modes are merely examples of systems corresponding to specific structures and operation functions described in the following.

Particularly, extremely wide variations are conceivable for the mode of the structure constituting a system (the number and kind as a server system) and the like, and according to that, various kinds of network connection modes, fee collecting systems, and the like are formed.

2. Medium

Next, data contents of a recording medium (disk 90, IC card 91, 91V) used in the system of this embodiment and the structure of the IC card 91V with a viewer will be described.

A user can obtain content by causing the desired content to be downloaded into a medium corresponding to the information providing apparatus 1.

Although the disk 90 or the IC card 91 (91V) used in the system of this embodiment requires that data can be rewritten, it is preferable to further include a region in which data can not be rewritten. Thus, the medium is configured such that a part is a reproduction only data region or a write protected region. Hereinafter, the reproduction only data region or write protected region will be generically referred to as a ROM region, and the rewritable region will be referred to as a RAM region.

Figure 2A:
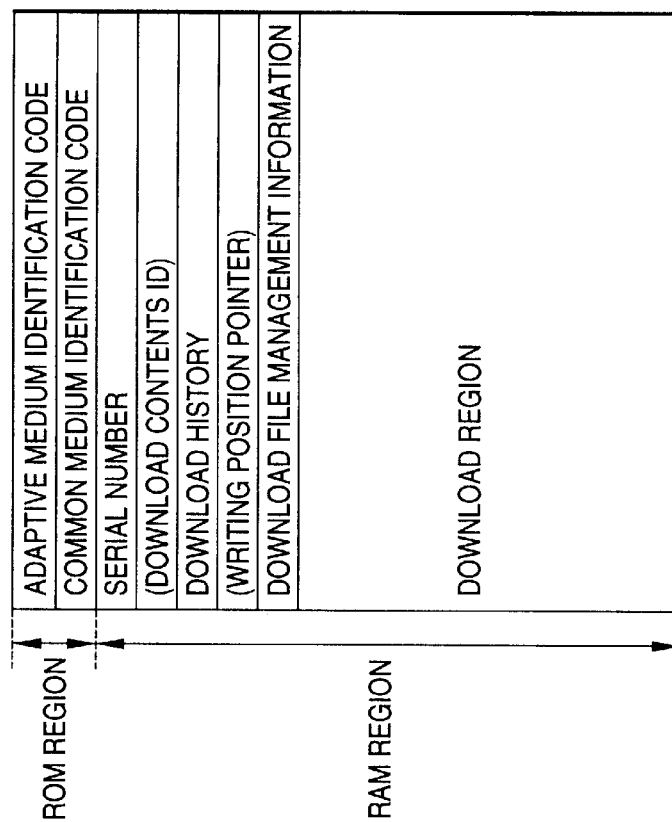
FIGS. 2A and 2B are explanatory views of data contents of recording media of an embodiment of the present invention.
Figure 2B:
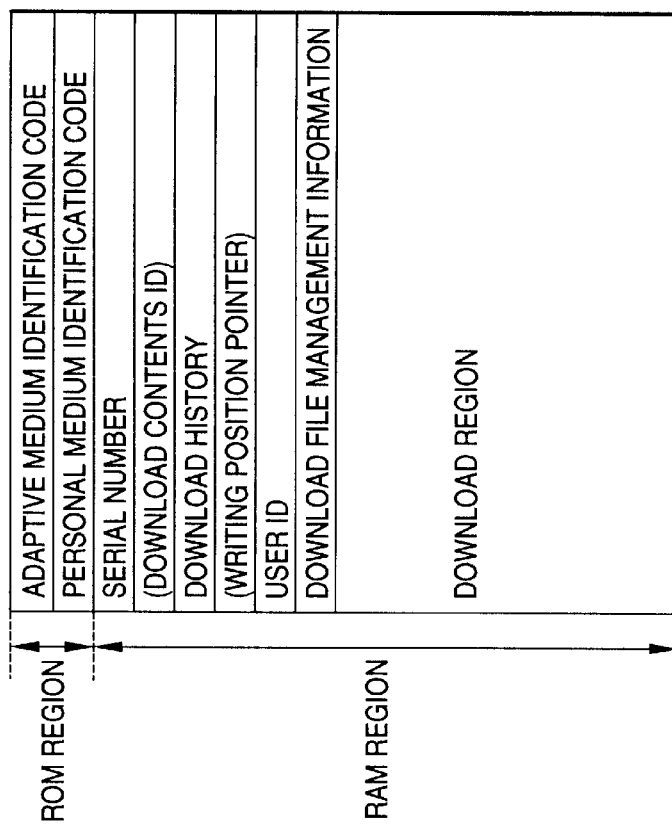

FIG. 2A shows data contents recorded in the disk 90 or the IC card 91 (91V) as a personal medium, and FIG. 2B shows data contents recorded in the disk 90 as a common medium.

In the case of the personal medium of FIG. 2A, a medium identification code indicating that the medium is adapted to the information providing apparatus 1 is recorded in the ROM region, that is, in the region where a user can not rewrite.

In this manner, when the disk 90 or the IC card 91 (91V), in which the adaptive medium identification code corresponding to the information providing apparatus is recorded, is loaded in the information providing apparatus 1, the information providing apparatus 1 detects that a proper medium corresponding to the system has been loaded.

Moreover, a personal medium identification code is recorded in the ROM region, which indicates that this medium is not one which is used for many unspecified people.

As information recorded in the RAM region, first, there are a serial number, download content ID (hereinafter referred to as content ID), download history, writing position pointer (hereinafter referred to as pointer), and user ID. These pieces of information, the foregoing adaptive medium identification code, and the personal medium identification code are placed as exhibit information which the medium exhibits to the information providing apparatus 1.

In the RAM region, a download region for actual download of content is prepared, and download file management information is recorded as a directory for managing recorded content.

First, the serial number is a code intrinsic to each medium, which is given to each medium just before shipment of the medium.

The content ID is a code for identifying some specific content. For example, like an A newspaper or B magazine, the ID indicates a specific commodity prepared in the information providing apparatus 1 as content.

In each medium, other than the case of only one content ID, a plurality of content IDs may be recorded. Moreover, a medium in which the content ID is not recorded is also conceivable.

As described later, if the content ID is recorded, the information providing apparatus 1 can determine the content, which the user desires to purchase, from the content ID. That is, it becomes unnecessary for the use to select content which the user desires to purchase when using the information providing apparatus 1.

As the download history, at least times information indicating how many times download of content has been repeated is recorded. That is, each time when download of some content is executed to a medium by the information providing apparatus 1, the information providing apparatus 1 rewrites (increment) the times information, so that the past download times is displayed.

Incidentally, not only the times information, but also the use date of the information providing apparatus 1, the name of downloaded content, and the like may be recorded.

Additionally, fee information charged as a result of download may also be recorded. That is, in the case of the personal medium owned by the user, when payment fees are recorded according to download carried out in the past, the user can confirm later the user's own use history or the sums paid. For example, in the case where the fee payment is made through credit card registration, it becomes useful for confirmation of the payment fee.

The pointer indicates an address (front position address) of an area in which download is to be made in the download region.

For example, when download is made into the medium, the information providing apparatus performs download recording of content from the address indicated by the pointer.

After the download is ended, the value of the pointer is renewed to another address for the next download.

In this manner, for example, it is possible to make such that different regions in the download region are used for each download, and it is possible to prevent the same place from being rewritten repeatedly so that a partial region of the medium is deteriorated and reliability is decreased.

The user ID is recorded in the personal medium in such a manner that the user purchased the personal medium sets arbitrary numerical values or character lines. This user ID has a meaning as a personal identification number when the user uses the personal medium to use the information providing apparatus 1. That is, it is designed such that only the person knowing the personal identification number as the user ID can use the medium.

It is appropriate to design such that the use can record the user ID into the medium by the information providing apparatus 1, the user's own personal computer, or the like.

On the other hand, in the case of a common medium of FIG. 2B, an adaptive medium identification code and a common medium identification code are first recorded in the ROM region.

The adaptive medium identification code indicates that it is a medium which can be used in the information providing apparatus 1 of this system.

Furthermore, the common medium identification code indicates that the medium is not an exclusive medium only for some specified person, but is used for many people through the information providing apparatus 1.

As information recorded in the RAM region, there are a serial number, content ID, download history, and pointer. Such information, the foregoing adaptive medium identification code, and the common medium identification code are placed as exhibit information exhibited to the information providing apparatus 1 by the medium.

Similarly to the case of the personal medium, a download region for actual download of content is prepared in the RAM region, and download file management information is recorded as a directory for managing recorded content.

The serial number is a code which is an intrinsic number to each medium similar to the personal medium.

The content ID is a code for identifying some specific content similar to the personal medium. Of course, other than the case of only one content ID, a plurality of contents IDs may be recorded. Moreover, a medium in which the content ID is not recorded is also conceivable.

In the download history, times information indicating how many times download of content has been repeated into the medium is recorded similarly to the personal medium.

Although the use date of the information providing apparatus 1, the name of downloaded content, charging information, and the like may be recorded, this is not for management of each person, but becomes information used for management at the system side.

The pointer indicates an address (head position address) of an area where download is to be made in the download region similar to the personal medium. The pointer is renewed at each download so that improvement in reliability of the medium is realized.

Various kinds of information, for example, those as described above are recorded in the personal medium and the common medium.

Incidentally, in the personal medium, it is appropriate that the serial number, the download history, and the pointer recorded in the RAM region are made such that these can not be freely rewritten by a user. On the other hand, it is convenient that the content ID and the user ID can be arbitrarily renewed by the user. For example, when the content ID is rewritten, content to be periodically purchased can be changed. Further, when the user ID is rewritten according to necessity, security can be improved. However, with respect to the change of the user ID, such a technique that only the owner can change the ID is required.

In the common medium, the serial number, the content ID, the download history, and the pointer are made such that these can not be freely rewritten by the user. Then it is designed such that these can be changed by the information providing apparatus 1 as the need arises.

In this embodiment, although the disk 90 and the IC card 91 (91V) are cited as examples of the recording medium, it is also possible to use other kind of data writable recording medium, for example, a tape-like recording medium or the like.

The various kinds of data contents shown in FIG. 2 are merely examples. All of the data are not necessarily required, and other necessary information may be recorded.

Here, the IC card 91V with a viewer will be described with reference to FIG. 3.

The IC card 91V with the viewer has a display function by the card itself in addition to a memory region (for example, S-RAM) as a so-called normal IC card.

The IC card 91V with the viewer may be formed such that the outer shape, size, connector structure, and the like are the same as the IC card 91, so that both the IC card 91 and the IC card 91V with the viewer can be used in the IC card adaptive information providing apparatus 1 described later, or the outer shape or the like of the IC card 91V with the viewer is made different from the normal IC card 91, and an information providing apparatus corresponding to the IC card 91V with the viewer is prepared.

Figure 3:
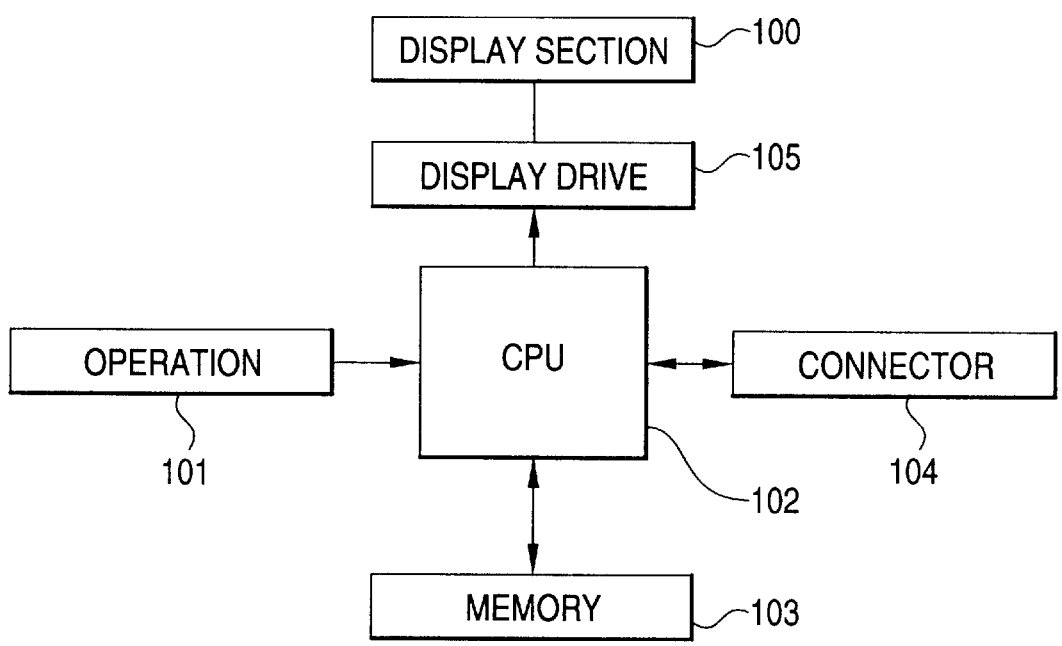
FIG. 3 is a block diagram of a structure of an IC card with a viewer of an embodiment of the present invention.

The inner structure of the IC card 91V with the viewer is, for example, shown in FIG. 3, and includes a display portion 100, an operation portion 101, a CPU 102, a memory 103, a connector portion 104, and a display drive portion 105. As the display portion 100, a small and thin device such as a liquid crystal panel is used. The operation portion 101 is formed as various kinds of operation keys on a card receptacle as shown in FIG. 1.

The memory 103 constitutes a storage region as the IC card, and is formed of, for example, an S-RAM. The data contents in the memory 103 are as shown in FIG. 2A.

Figure 13:
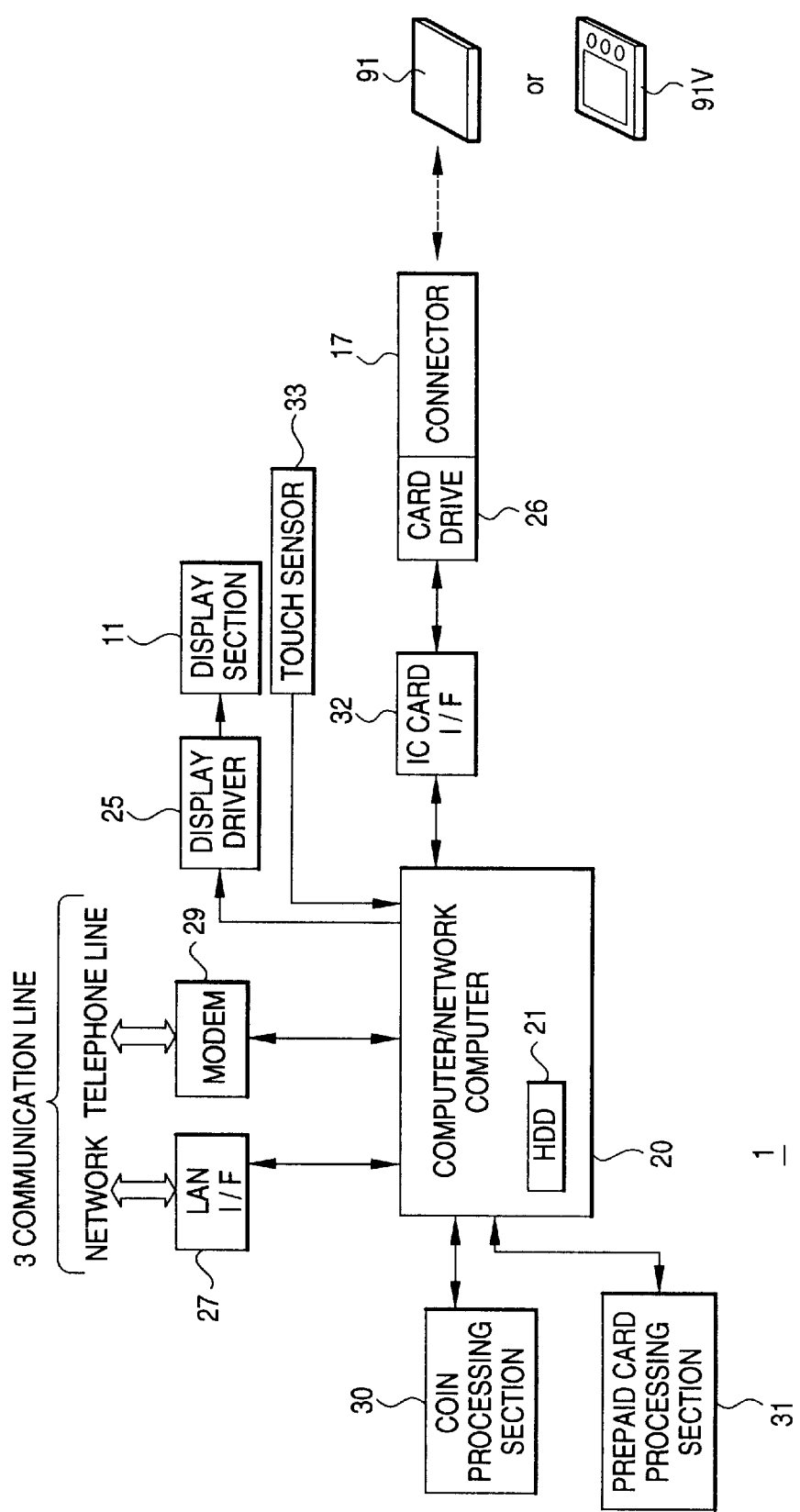
FIG. 13 is a block diagram of an IC card adaptive type information providing apparatus of the embodiment.

When the card is loaded in the information providing apparatus 1, the connector portion 104 is connected to an inner card connector portion 17 described in FIG. 13, and transmission/reception for writing/reading of data is carried out.

The CPU 102 becomes a portion for controlling operations of data reading and data writing to the memory 103. Further, as the data reading, the CPU 102 performs reading control for transmission of various kinds of exhibit information described in FIG. 2 to the side of the information providing apparatus 1, and further, performs reading control for display of data downloaded and stored in the memory 103 at the display portion 100.

The CPU 102 reads content data or the like from the memory 103 in accordance with the operation from the operation portion 101, and transmits the data for display to the display drive portion 105. The display drive portion 105 causes the display portion 100 to execute a display operation on the basis of the data from the CPU 102.

In this manner, the IC card 91V with the viewer itself can display and output the downloaded content and the like, and the user can see the content even if a personal computer or portable reproducing apparatus is not used.

Of course, as described above, a sound output portion (for example, a headphone output system, a speaker output system) may be provided to enable sound output.

3. Structure of a disk adaptive type information providing apparatus

As the information providing apparatus 1, although a disk adaptive type and an IC card adaptive type are exemplified, the disk adaptive type information providing apparatus will be first described.

Figure 4:
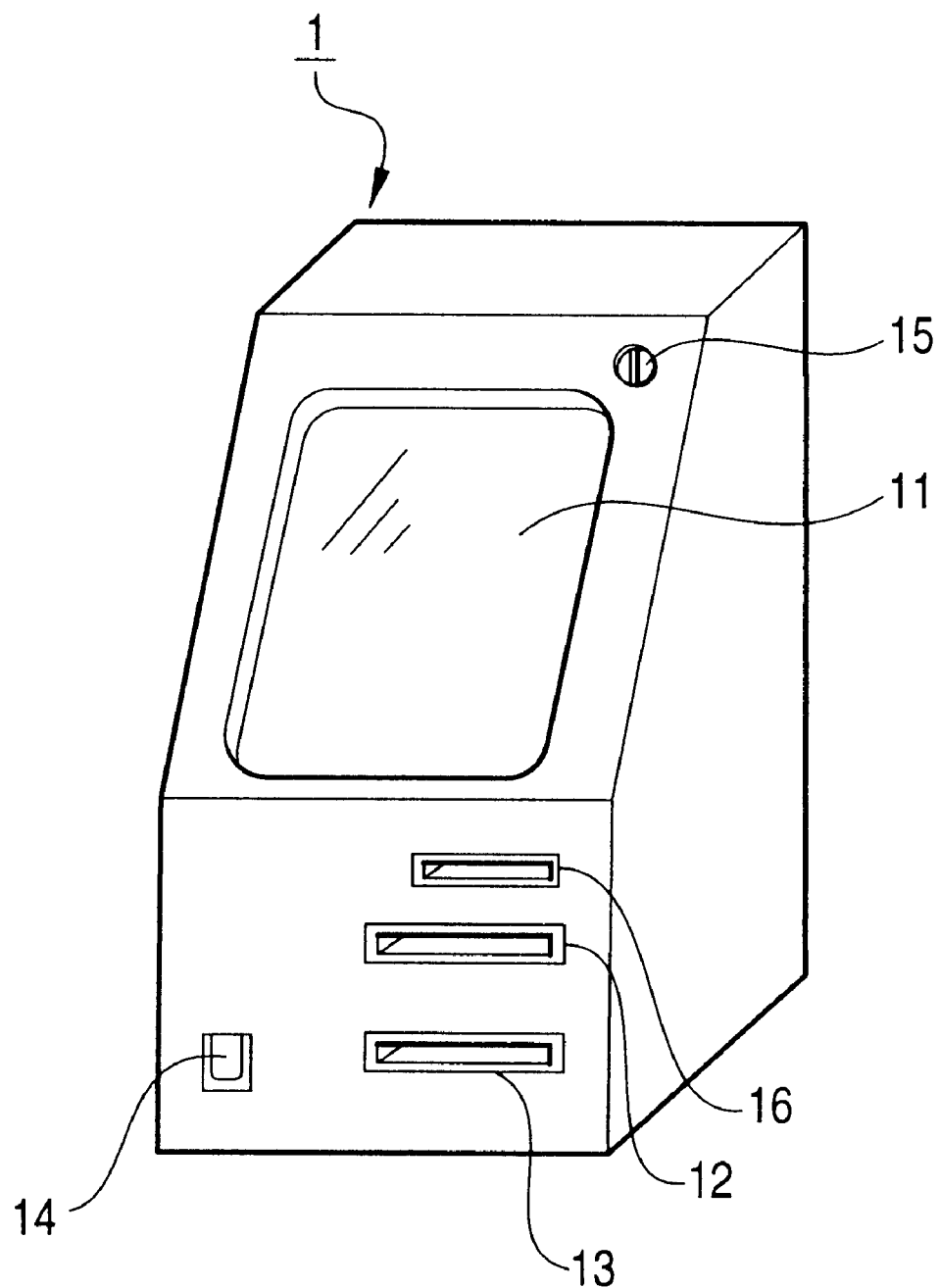
FIG. 4 is an explanatory view of an example of an outer appearance of a disk adaptive type information providing apparatus of an embodiment of the present invention.

FIG. 4 shows an example of an outer appearance of the disk adaptive type information providing apparatus 1.

The information providing apparatus 1 is disposed at a store or the like on the assumption that the public use it, and in this embodiment, it has an outer appearance similar to, for example, a normal public telephone.

As shown in the drawing, a display portion 11 using a liquid crystal panel, a cathode ray tube (CRT), or the like is formed on the front upper portion of the information providing apparatus 1, and various kinds of image display at the use of the information providing apparatus 1 are made.

In the case where the user uses the information providing apparatus 1, although an input function such as an operation key becomes necessary, in this structural example, a mechanical input key such as an operation key is not formed.

Although described later in detail, in this example, there is provided a touch sensor mechanism (touch sensor 33 in FIG. 5) for detecting a position on the screen of the display portion 11 where the user touches with a finger or the like, and display of necessary various kinds of operation keys and the like is made on the display portion 11. That is, it is designed such that the user performs an operation of pressing each key on the image displayed on the display portion 11 so that various kinds of operation input can be made.

However, a mechanical input key portion such as a keyboard or an input mechanism such as a mouse can be provided. Further, it is also conceivable that a voice recognition mechanism is provided to enable voice input.

When the information providing apparatus 1 is used, although there is a case where the disk 90 owned by the user is loaded, a disk insertion portion 12 is provided as a place where the disk 90 is inserted.

When the user inserts the disk 90 from the disk insertion portion 12, it is possible to make such a state that the disk 90 is loaded on a disk drive (disk drive 24 of FIG. 5) by an internal mechanism, and the information providing apparatus 1 becomes capable of performing recording and reproducing operations to the disk 90.

Besides, a disk ejection portion 13 is prepared so that the user receives the disk 90 in which desired content has been downloaded.

As fee payment modes of a user when the information providing apparatus 1 is used, as described above, there are payment by credit card registration, and payment by inserting money, a prepaid card, or a credit card. However, for simplification of description, it is assumed that the payment by inserting a credit card can not be managed in this embodiment.

In the information providing apparatus 1, in order to manage the payment by money/prepaid card, a coin insertion portion 15 and a prepaid card insertion portion 16 are provided as shown in the drawing.

For the purpose of returning the change used in the case where a coin is inserted, a coin returning port 14 is prepared.

Figure 5:
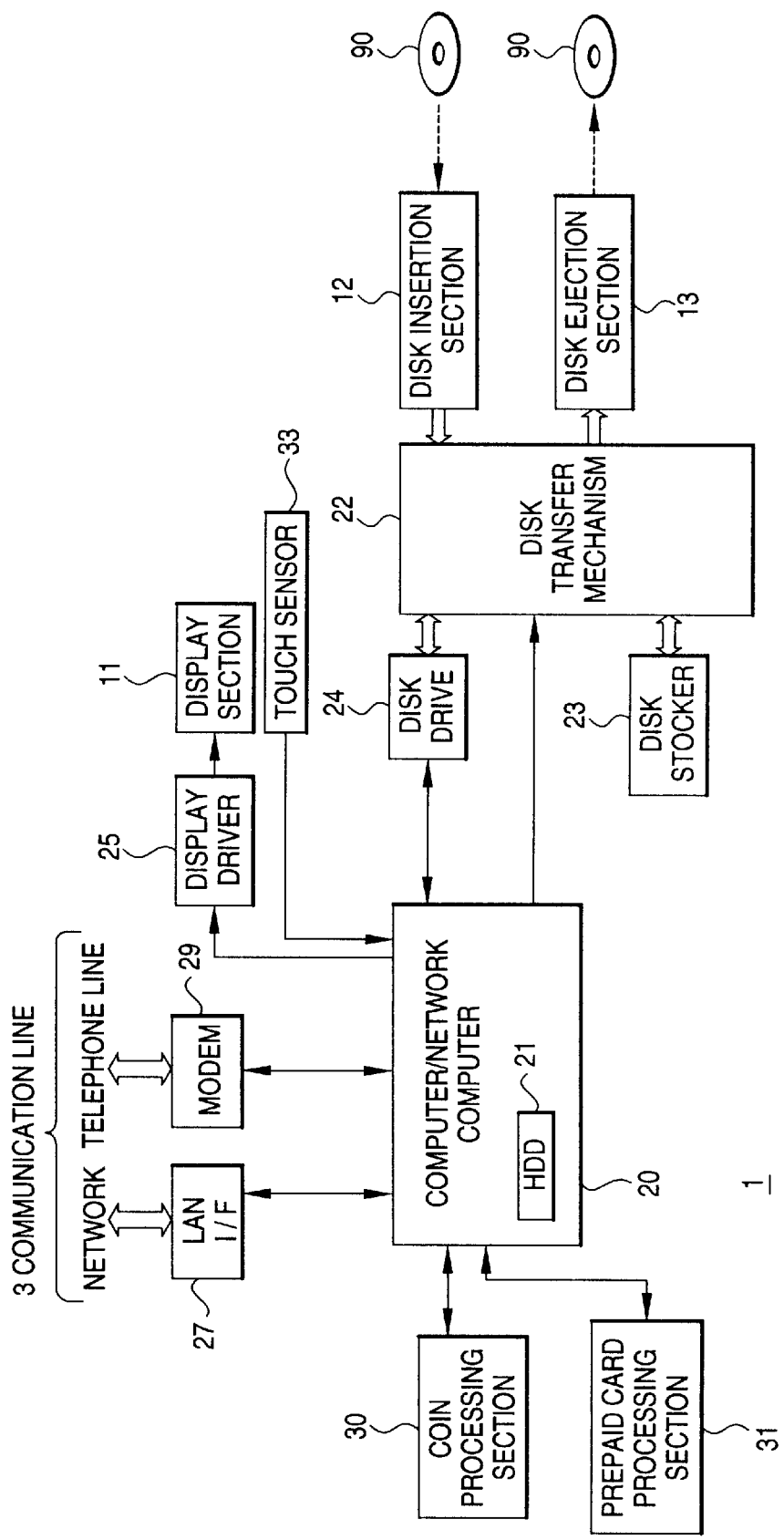
FIG. 5 is a block diagram of the disk adaptive type information providing apparatus of one embodiment of the present invention.

FIG. 5 shows an internal structure of the disk adaptive type information providing apparatus 1.

A computer/network computer 20 (hereinafter referred to as a computer 20) is a unit portion in which the information providing apparatus 1 performs download and various other necessary processing, and includes a CPU for executing arithmetic/control processing, a RAM portion as a main storage region, a ROM portion for holding an OS (Operating System) and other programs, an interface function to each portion in the information providing apparatus 1, an interface function to a network 7 and a telephone line 8, and so on.

Moreover, the computer includes a hard disk drive (hereinafter referred to as HDD) 21 as an internal storage medium.

A disk transfer mechanism 22 is a mechanism for transferring a desired disk to a desired portion according to instructions of the computer 20 among the disk insertion portion 12, the disk ejection portion 13, the disk drive 24, and a disk stocker 23.

For example, the disk 90 inserted from the disk insertion portion 12 is loaded on the disk drive 24 by the disk transfer mechanism 22, and recording/reproducing is enabled. That is, when the insertion of the disk 90 from the disk insertion portion 12 is detected, the computer 20 instructs the disk transfer mechanism 22 to transfer the disk 90 to the disk drive 24.

Further, in the case where the disk 90 inserted by the user is a personal disk, as described later, the computer 20 causes content desired for the disk 90 to be downloaded, and when download is ended, the computer causes the disk transfer mechanism 22 to transfer the disk to the disk ejection portion 13 and returns it to the user.

A number of disks in which content has been previously downloaded are stocked in the disk stocker 23. The disks 90 stocked here become common disks.

Figure 6:
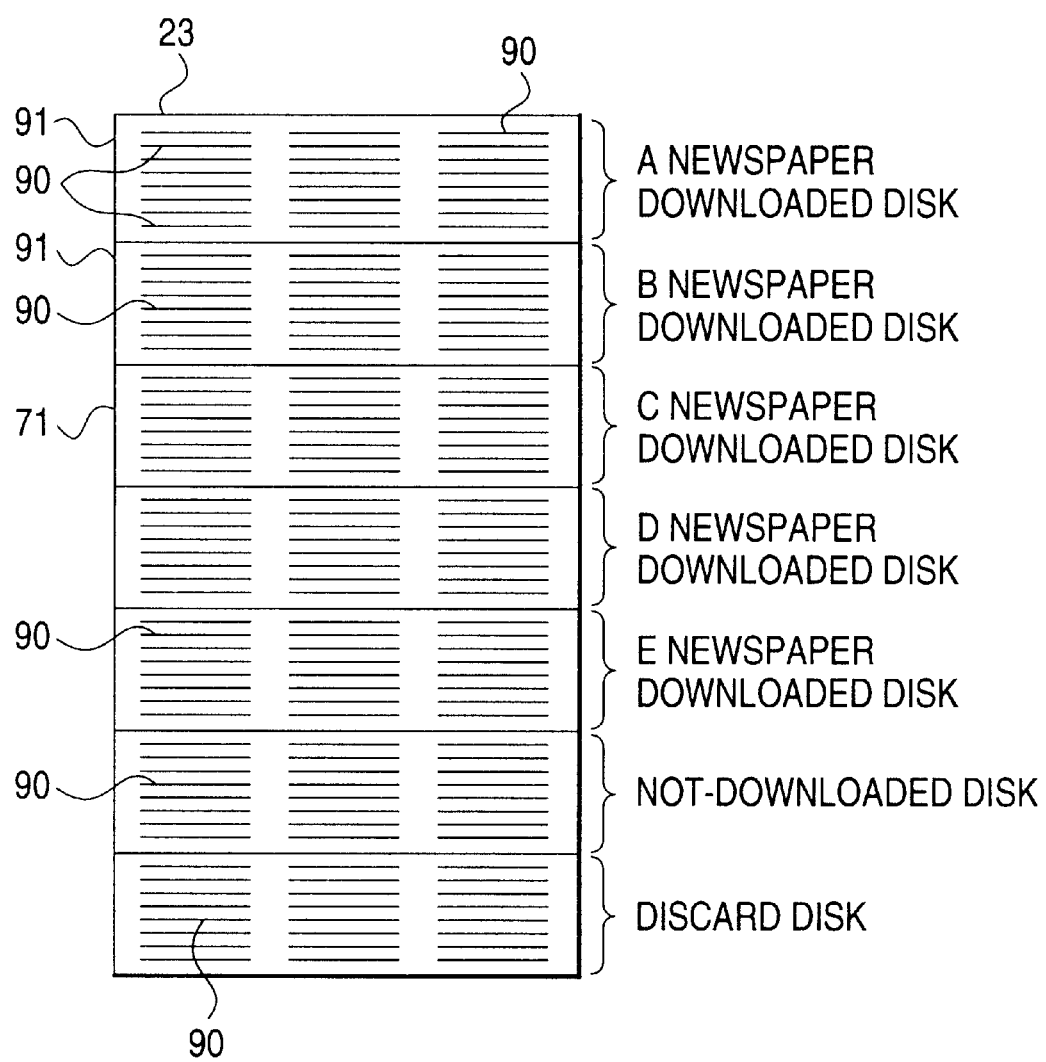
FIG. 6 is an explanatory view of a disk stocker of the disk adaptive type information providing apparatus of one embodiment of the present invention.

For example, when it is assumed that the information providing apparatus 1 can provide each of the A newspaper, B newspaper, C newspaper, D newspaper, and E newspaper as content, a plurality of disks 90 in which the respective content has been already downloaded, are contained in the disk stocker 23 as shown in FIG. 6. Besides, a disk 90 in which anything has not been downloaded, or a disk 90 which was acknowledged as waste is also contained.

In the case where the user inserts the common disk 90, or in the case where the user does not insert the disk 90 but makes an operation to purchase content, the computer 20 causes the disk transfer mechanism 22 to take out the disk 90 in which the desired content has been already downloaded from the disk stocker 23, and to transfer the disk to the disk ejection portion 13, so that it is provided to the user.

Besides, the computer 20 can cause a not-downloaded disk to be transferred to the disk drive from the disk stocker 23, can cause desired content to be downloaded into the not-downloaded disk, and can provide it to the user from the disk ejection portion 13, or can cause it to be stocked as a downloaded disk in the disk stocker 23.

As the disks 90 which are stored in the disk stocker 23 and in which the A newspaper, B newspaper, C newspaper . . . and the like have been downloaded, such a system may be adopted that the disks themselves prepared by the server 2 (that is, previously downloaded disks) are distributed to the information providing apparatus 1 and a person in charge mounts them in the disk stocker 23. In the case where content as renewal data are provided from the server 2 to the HDD 21 through the communication line 3, such processing may be made that the computer 20 causes each disk 90 in the disk stocker 23 to be sequentially loaded on the disk drive 24, the recorded contents are renewed, and the disk is again returned to the disk stocker 23.

To the disk 90 loaded on the disk drive 24, the disk drive 24 can perform recording/reproducing operations in accordance with read/write requests from the computer 20.

That is, when the computer 20 transmits a read command, a read position address, data length, and the like to the disk drive 24, the disk drive 24 performs a read operation according to the instruction, and sends the read data to the computer 20. For example, when the user inserts the disk (personal disk or common disk), the computer 20 causes the disk transfer mechanism 22 to mount the disk 90 on the disk drive 24, and gives instructions to make the reading operation, so that the computer gives instructions to read various kinds of information as the exhibit information as shown in FIGS. 2A and 2B. In response to this, the disk drive 24 reads data as various kinds of exhibit information, and transfers them to the computer 20.

The computer 20 transmits the write command, writing position address, data length, file data to be written, and the like to the disk drive 24, so that the disk drive 24 performs the writing operation in response to the instructions, and records the transmitted data file in the disk 90.

That is, in the case where download of content is carried out, the computer 20 supplies the data of the content as writing data, and performs the above writing control, to cause the disk drive 24 to execute the download to the disk 90.

In the display portion 11, as a monitor screen of a so-called download processing/operation, a GUI picture image or menu image, an operation guide, and the like are displayed. The computer 20 gives information to be displayed to a display driver 25, and the display driver 25 executes displaying to the display portion 11.

The operation input key necessary for the operation of the user at downloading is expressed by a display image at the display portion 11, and the operation input contents are detected in response to the detection of a pressed position to the screen by the touch sensor 33.

That is, the computer 20 causes the display portion 11 to make keyboard display, menu icon display, function key display, and the like, and monitors the pressed position of the user to the screen by the touch sensor 33.

The touch sensor 33 detects a position on the screen in a plane direction in, for example, the x-y coordinates, and in the case where the user touches some position on the screen, the sensor supplies the coordinate data to the computer 20.

When the computer 20 is supplied with the coordinate data, the computer detects an operator (image such as a key) corresponding to the position of the coordinate data in the contents displayed on the display portion 11 at that time. Then the computer detects that the operation contents by the detected operator has been inputted.

Thus, in the case where the computer 20 causes the display portion 11 to display an image simulating, for example, an operation key, the user can make various kinds of input by touching the operation key on the screen.

The information providing apparatus 1 of this embodiment includes a LAN interface 27, and is connected to the network as the communication line 3. By this, the computer 20 can make data communication with the server 2 as shown in FIG. 1.

Besides, the computer 20 is connected to the telephone line as the communication line 3 through a modem 29, so that data communication through the telephone line is made possible.

When the computer is connected to the telephone line, for example, it becomes possible to use this information providing apparatus 1 as a public telephone as well. In that case, it is appropriate that a receiver-transmitter 18 and a predetermined telephone processing circuit system are provided.

In order to process the coin insertion payment as described above, this information providing apparatus 1 is provided with a coin processing portion 30 which carries out a fee collecting processing with a coin inserted from the coin insertion portion 15 and a returning processing of change.

A prepaid card processing portion 31 performs a fee collecting processing with a prepaid card inserted from the prepaid card insertion portion 16. For example, processing, such as renewal of magnetic data of the prepaid card and punching, corresponding to the fee to be collected is carried out.

In the case where the user pays through credit card registration, that is, in the case where a coin or a prepaid card is not inserted in the information providing apparatus 1, processing in the coin processing portion 30 and the prepaid card processing portion 31 is not carried out.

In that case (for example, credit card registration payment is made possible only in the case where a personal disk is used), by using the serial number and the user ID recorded in the disk 90, the user ID and other personal identification number inputted by the user, and the like, high level identification processing is carried out, for example, through communication to the server 2. If the identification result is OK, the user is allowed to use the information providing apparatus 1. In that case, as business processing at the side of the server 2, charging the user (charging to the user's bank account) is performed.

Although the information providing apparatus 1 is structured, for example, as described above, all of the structural elements are not necessarily required, and a structural element which is not exemplified may be provided.

As an example in which other structural elements are added, it is conceivable that a printer portion is disposed and print output is made possible at the use of the information providing apparatus 1. of course, a printer unit as a separate body from the information providing apparatus 1 may be connected and disposed.

Besides, a power amplifier and a speaker unit may be provided so that in the case where music or the like as content is provided, the user can listen to the music or the like by way of trial at that place.

Further, in the case where the use of the information providing apparatus 1 is made free, the coin insertion portion 15, the coin processing portion 30, the prepaid card insertion portion 16, and the prepaid card processing portion 31 naturally become unnecessary.

4. Use procedure to a disk adaptive type information providing apparatus

Figure 7C:
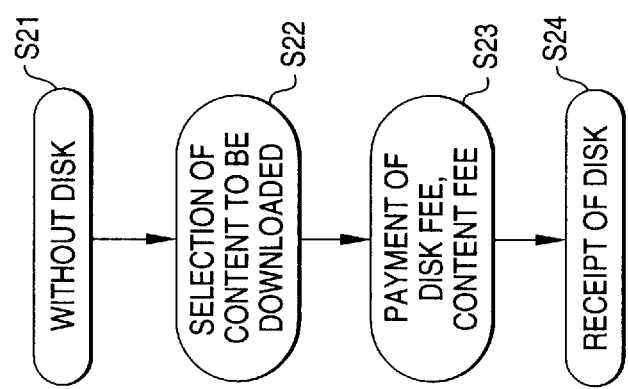
FIGS. 7A to 7C are explanatory views of use procedures of the disk adaptive type information providing apparatus of one embodiment of the present invention.
Figure 7B:
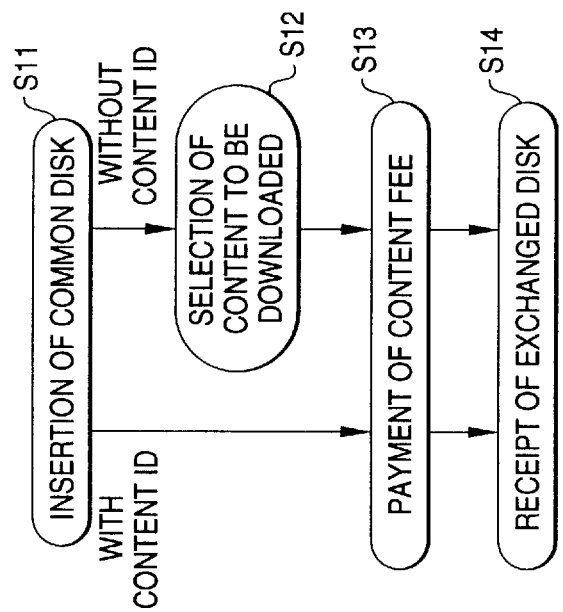
Figure 7A:
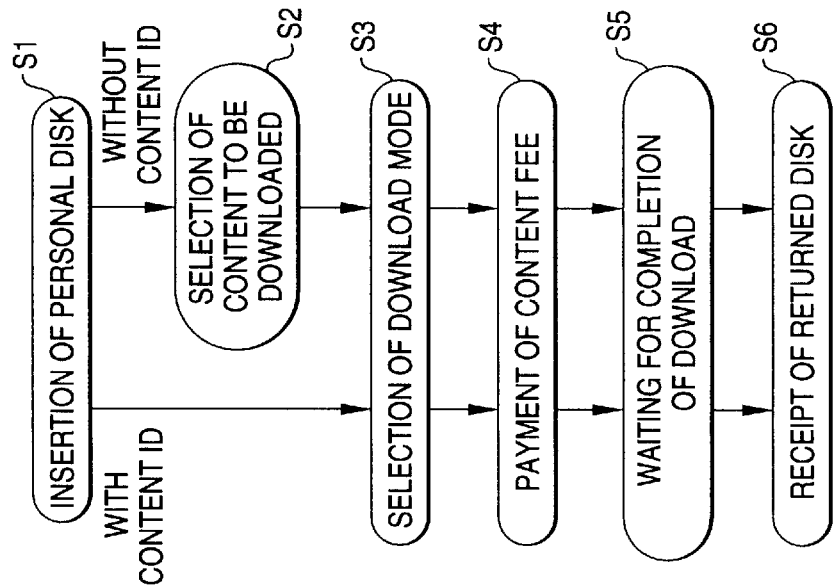

The use procedure of a user to the information providing apparatus 1 of this embodiment will be described with reference to FIGS. 7A to 7C in which FIG. 7A shows steps S1 to S6, FIG. 7B shows steps S11 to S14, and FIG. 7C shows steps S21 to S24.

In the case where the user uses the information providing apparatus 1, there are a use mode in which the user uses the user's own personal disk 90, a use mode in which the user uses the common disk 90 possessed by the user, and a use mode in which the disk 90 is not used.

The use procedure for each of these will be described. However, the procedure shown here is only the basic procedure, and there is also a case where the procedure becomes different according to the state of the disk or the stock state at the disk stocker 23.

In the case where the user does not possess the disk 90, the user uses the apparatus in the procedure shown in steps S21 to S24.

The user performs an operation to make use from the initial screen displayed on the display portion 11 of the information providing apparatus 1. The information providing apparatus 1 (computer 20) enters the processing mode in the case where there is no disk insertion. For example, at this time, the user is requested to select desired content from the content menu displayed on the display portion 11 as content which can be purchased. The user selects content by a touch operation, which the user desires to purchase (download) (S22).

The user subsequently inserts a coin or a prepaid card as a fee payment processing (S23). For example, the fee corresponding to the selected content is displayed on the display portion 11, and in response to the request for fee payment, the user pays the fee. In the case where the disk is not inserted, since such a mode is adopted that a common disk 90 is rented to the user, the fee includes also a compensation of the disk 90.

In this embodiment, in the case where the personal disk 90 is not used, use with credit card registration payment is made impossible.

When the fee is paid, the computer 20 takes out a common disk 90 in which the selected content has been already downloaded, from the disk stocker 23, and ejects it from the disk ejection portion 13. It is satisfactory if the user receives the ejected disk 90 (S24).

As described above, the user can receive the disk 90 in which the desired content is recorded in the procedure like a vending machine.

For example, when the user once uses the information providing apparatus 1 in this manner, he or she can get the common disk 90 together with the content purchased at that time. Then, from the next time, when the user inserts the common disk 90 to use the information providing apparatus, it becomes sufficient if the user pays only the content purchase fee.

The procedure of the case where the common disk 90 is inserted will be described in steps S11 to S14.

The user inserts the common disk 90 from the disk insertion portion 12 (S11).

The procedure becomes different according to whether the content ID (See FIG. 2B) is recorded in the common disk 90.

If the content ID is recorded, the information providing apparatus 1 (computer 20) determines that the content indicated by the content ID is the content which the user desires, so that it becomes unnecessary for the user to select the content which the user desires to purchase. On the other hand, in the case where the content ID is not recorded, a display to request the user to select desired content from a menu displayed as content which can be purchased is made on the display portion 11 (S12).

When the content is selected and set with the content ID or selecting operation, the user subsequently inserts a coin or a prepaid card (S13) as the fee payment processing. For example, the fee corresponding to the content selected and set is displayed on the display portion 11. The user pays the fee in response to the request for fee payment. In this case, since the user paid the compensation relative to the rental of the common disk 90, the fee does not include the compensation of the disk 90.

When the fee is paid, the computer 20 takes out a common disk 90 in which the selected and set content has been already downloaded, from the disk stocker 23, and ejects it from the disk ejection portion 13. It is satisfactory if the user receives the disk 90 (S14). At this time, the disk 90 itself becomes different from one which the user inserted. That is, the disk 90 is exchanged.

The case where the content ID is recorded in the common disk 90 means such a case that the common disk is made to be used for only specific content to be downloaded.

For example, providing that the common disk 90, in which the content ID indicating the A newspaper is recorded, is prepared, when the user mounts the disk, he or she can receive the common disk in which the content ID indicating the same A newspaper is recorded and which includes the contents of the A newspaper on that day. That is, when the disk is made to be used for only some specific content, it is not necessary for the user to always make a selecting operation at the time of the use of the information providing apparatus. Thus, it becomes convenient for the user who desires to purchase the content of the same newspaper every day.

If the user purchases the personal disk 90 in advance, when the user inserts the personal disk 90 at the use of the information providing apparatus 1, the user only has to pay the purchase fee of the content.

The procedure in the case where the personal disk 90 is inserted is shown in steps S1 to S6.

The user first inserts the personal disk 90 from the disk insertion portion 12 (S1).

Here, the procedure becomes different according to whether or not the content ID (see FIG. 2A) has been recorded in the personal disk 90.

If the content ID is recorded (that is, if the user records the content ID indicating some specific content), the information providing apparatus 1 (computer 20) determines that the content indicated by the content ID is the content which the user desires, so that it becomes unnecessary to select the content which the user desires to purchase. On the other hand, in the case where the content ID is not recorded, the user is requested to select desired content from a menu displayed on the display portion 11 as content which can be purchased. The user selects the content by a touch operation, as to which the user desires to purchase (S2).

When the content is selected and set with the content ID or selecting operation, the user is subsequently requested to select a download mode, and the user performs the selecting operation (S3). This download mode determines, for example, such a download system that the past downloaded data are to be stored or the past download data are erased, a distinction as to the contents to be downloaded, for example, which of a Japanese document and an English document is selected, a level of downloaded information contents (for example, whether additional information is also contained, and so on), and the like.

Additionally, a method may be adopted where plural kinds of modes are not prepared as such download modes, but only one download mode is selected.

The user subsequently inserts a coin or a prepaid card as the fee payment processing (S4). For example, the fee corresponding to the selected and set content is displayed on the display portion 11, and the user pays the fee in response to the request for fee payment. In this case, the fee of the disk itself is not naturally contained.

In the case where the personal disk 90 is used, it is possible to make payment through registration of a credit card. However, in this case, it becomes necessary for the user to previously make credit card registration to the constitution as the server 2.

In the case where payment through the credit card registration is made, at the payment of the fee, the user inputs the user ID and the like for identification processing as to whether or not charging to the credit card is to be made.

When the fee is paid, the computer 20 causes download of the selected content into the disk 90 loaded on the disk drive 24 in response to the payment by the user. Thus, the user waits for the completion of the download operation during that (S5).

When the download is completed, the computer 20 ejects the disk 90 from the disk ejection portion 13, so that it is sufficient if the user receives the disk 90 (S6). That is, in this case, the download of content is executed into the personal disk 90 itself which the user inserted, and the personal disk 90 inserted by the user is returned to the user.

Incidentally, it is designed such that the user can arbitrarily record the content ID to the personal disk 90. Thus, for the user who desires to purchase the content of the same newspaper every day, if the content ID indicating the content is recorded, it becomes unnecessary to always make a selecting operation at the time of use of the information providing apparatus, which is convenient for the user.

5. Processing of a disk adaptive type information providing apparatus

The processing of the computer 20 of the information providing apparatus 1 in which the use in the above procedure is realized and which is for providing the content requested by the user will be described with reference to flowcharts of FIGS. 8 to 11.

Figure 8:
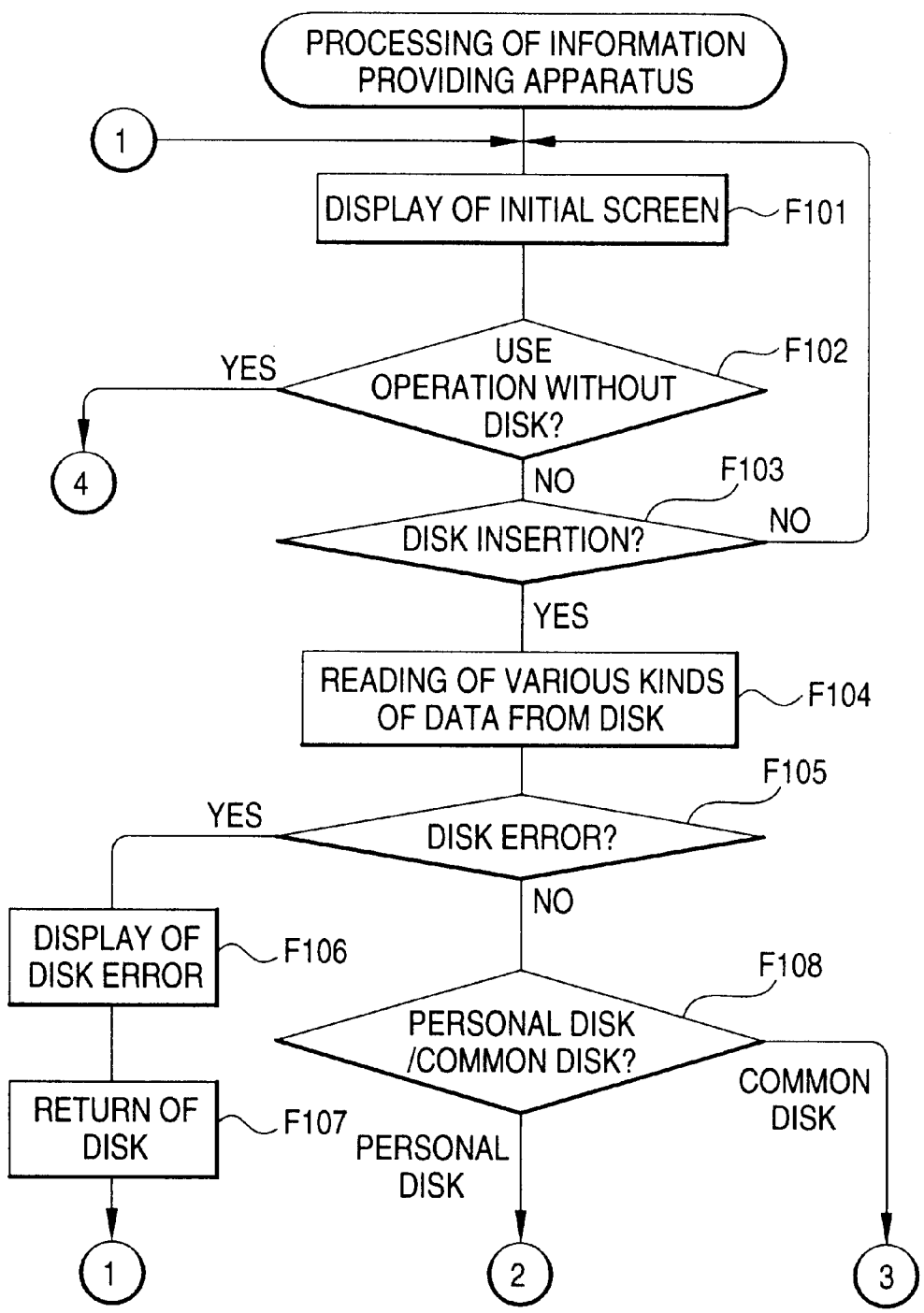
FIG. 8 is a flowchart of a processing of the disk adaptive type information providing apparatus of one embodiment of the present invention.

At step F101 of FIG. 8, the information providing apparatus 1 stands by at a set place in the state where an initial screen is displayed on the display portion 11.

Although various kinds of initial screens are conceivable a s examples, for example, a menu image of content which can be purchased through the information providing apparatus 1, or a display to request selection of use with disk insertion or without disk is sufficient.

The computer 20 executes monitoring processing of steps F102 and F103 in the state where the initial screen is displayed at step F101. That is, the computer monitors whether an operation to purchase content has been carried out without inserting the disk 90, or whether the disk 90 has been inserted.

Figure 11:
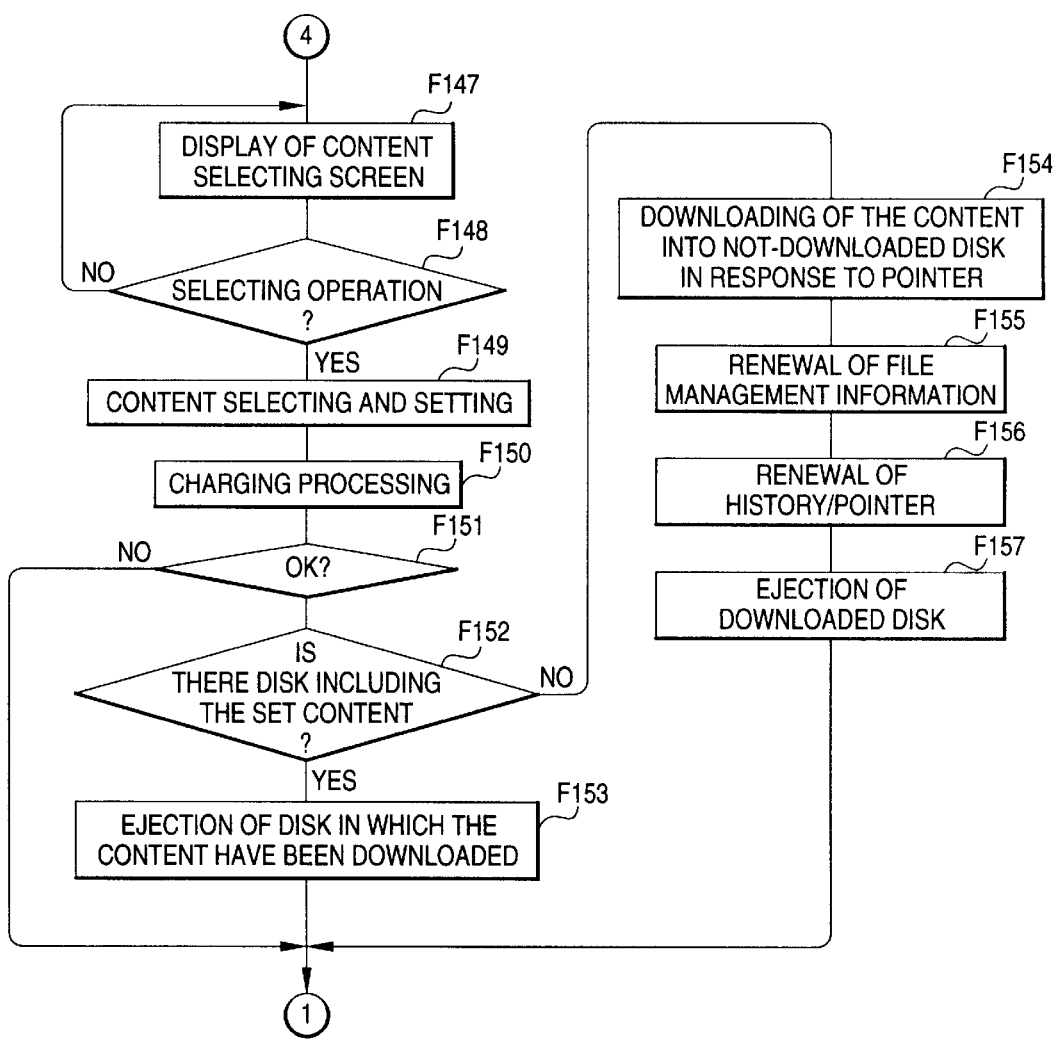
FIG. 11 is a flowchart of processing of the disk adaptive type information providing apparatus of one embodiment of the present invention.

In the case where the user performs the operation to purchase content without using the disk 90 (that is, in the case where the procedure S21 to S24 of FIG. 7 is executed) in the state where the initial screen is displayed, the computer 20 proceeds from step F102 to step F147 of FIG. 11 as shown by ④.

The computer 20 causes, as a content selecting screen, the display portion 11 to display a menu of content which can be purchased and to make a display to request selection.

The computer 20 waits for a selecting operation of a user while performing display control at the step F147, and when the selecting operation of some content is performed, the computer 20 proceeds from step F148 to F149. The computer 20 detects the contents of the selecting operation and performs setting operation to indicate that specific content has been selected.

Subsequently, the computer 20 performs charging processing at step F150. That is, the computer 20 shows the fee of the content selected and set and the compensation for the rental of the disk 90 by use of the display portion 11, and requests payment of the fee. The computer 20 waits for the insertion of a coin or a prepaid card by the user, and when the insertion is made, the computer causes the coin processing portion 30 or the prepaid card processing portion 31 to execute a necessary charging processing.

At the charging processing, it is designed such that the user can made a cancel operation. In the case where the user makes the cancel operation, or in the case where a predetermined time has elapsed while the fee payment has not been made, the computer 20 determines that the charging processing is NG and returns from step F151 to step F101 of FIG. 8 as shown by ①. That is, the processing is ended.

When the fee payment is properly made and charging processing becomes OK, the computer 20 proceeds from step F151 to step F152.

Here, the computer 20 confirms whether the disk 90 in which the selected and set content has been recorded exists in the disk stocker 23. That is, stock confirmation is made.

If the objective disk 90 exists in the disk stocker 23, at step F153, the computer 20 controls the disk transfer mechanism 22 to take out the disk 90 from the disk stocker 23, and to transfer it to the disk ejection portion 13. That is, by this, the user can receive the disk 90 in which the desired content has been recorded. Then the processing of the computer 20 is completed, and returns to step F101 of FIG. 8.

However, in the case where the objective disk 90 does not exist in the disk stocker 23, for example, in the case where only specific content has been intensively purchased and sold out, the computer 20 proceeds to step F154, and controls the disk transfer mechanism 22 so that a not-download disk is taken out from the disk stocker 23 and is loaded on the disk drive 24. The computer gives recording operation instructions to the disk drive 24, and supplies the content data stored in the HDD 21 to the disk drive 24. By this, the objective content is downloaded and recorded in the disk 90 loaded on the disk drive 24.

Recording of the content in this case is executed at the position indicated by the pointer recorded in the disk 90.

At step F155, the computer 20 renews the file management information (see FIG. 2B) of the disk 90 according to the download record of the content, and enables the content to be reproduced by an apparatus at the user side.

At step F156, the computer 20 renews (increment) the history information (information of download times) of the disk 90, and renews the value of the pointer to a value indicating a writing position address at the next download.

By the processing at steps F154, F155, and F156, the content desired by the user are downloaded to some not-downloaded disk. The computer 20 controls the disk transfer mechanism 22 at step F157, and causes the disk transfer mechanism to take out the disk 90 from the disk drive 24 and to transfer it to the disk ejection portion 13. That is, in this manner, the user can receive the disk 90 in which the desired content is recorded.

As shown above, the processing of the computer 20 is completed, and returns to step F101 of FIG. 8.

In the case where the user inserts the disk 90 into the disk insertion portion 12 in the initial screen display state at step F101 of FIG. 8, the computer 20 proceeds from step F103 to step F104.

First, the computer 20 instructs the disk transfer mechanism 22 so that the inserted disk is loaded on the disk drive 24. When the disk is loaded on the disk drive 24, the computer gives data read instructions to the disk drive 24, so that the exhibit information of the disk 90 is read. That is, the identification code and other exhibit information explained in FIG. 2 are read.

At step F105, the computer 20 first confirms the adaptive medium identification code among the exhibit information read out from the disk 90 at step F104, and detects whether or not the inserted disk is a disk adapted to the information providing apparatus 1.

In the case where it is not a suitable adaptive medium identification code, the computer 20 determines that the disk is one not adapted to the information providing apparatus 1 (disk error). Then the computer 20 proceeds from step F105 to step F106, notifies the user of the disk error through the expression of the disk error on the display portion 11, and returns the disk to the user at step F107. That is, the computer 20 instructs the disk transfer mechanism 22 to transfer the disk loaded on the disk drive 24 to the disk ejection portion 13. Then the computer 20 returns to step F101. That is, the computer 20 completes the processing.

In the case where the identification code is properly confirmed as to the inserted disk, the computer 20 proceeds from step F105 to step F108, detects whether the disk 90 is a personal disk or a common disk, and makes the processing branch off. That is, the computer 20 makes the processing branch off according to whether the personal medium identification code has been detected as the exhibit information of the disk 90 or whether the common medium identification code has been detected. In the case where the disk is a personal disk, the computer 20 proceeds to step F109 of FIG. 9 as indicated by ②, while in the case where the disk is a common disk, the computer 20 proceeds to step F127 of FIG. 10 as indicated by ③.

Figure 10:
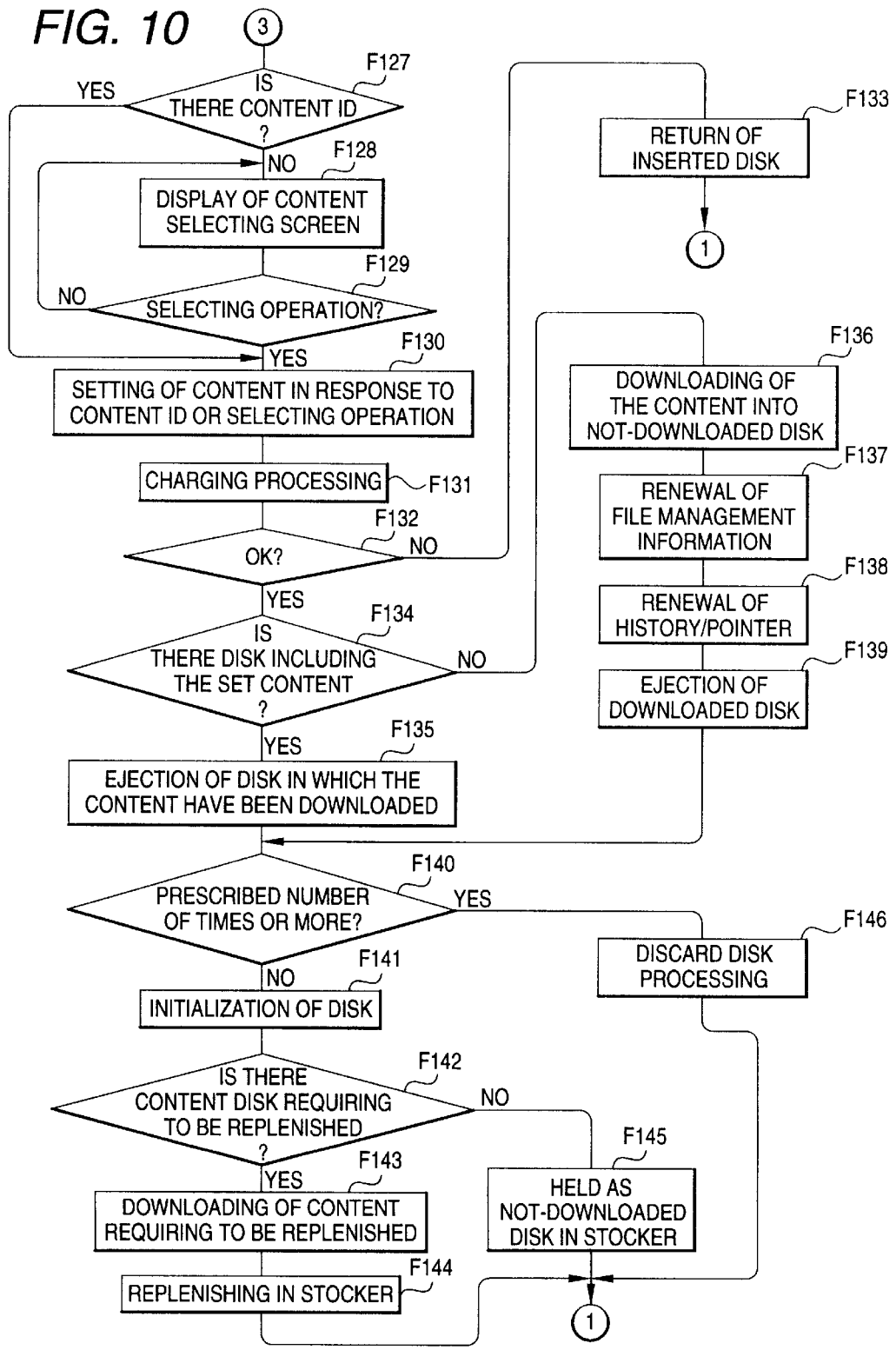
FIG. 10 is a flowchart of processing of the disk adaptive type information providing apparatus of one embodiment of the present invention.

First, the processing in the case of the common disk will be described from step F127 of FIG. 10.

First, the computer 20 confirms whether or not the content ID exists in the detected exhibited information.

In the case where the content ID is not recorded at step F128, the computer 20 causes the display portion 11, as a content selection screen, to display a menu of content which can be purchased and a request for selection.

The computer 20 waits for a selecting operation of the user while causing the display portion 11 to make display at step F128, and when the selecting operation of some content is made, the computer proceeds from step F129 to step F130. The computer 20 detects the contents of the selecting operation, and sets selected content.

On the other hand, in the case where the content ID is recorded, the computer 20 proceeds directly from step F127 to step F130. Then the computer 20 sets the content indicated by the content ID.

Subsequently, the computer 20 performs a charging processing at step F131. That is, the computer 20 causes the display portion 11 to display the fee of the content set at step F130, and requests the user to pay the fee. The computer 20 waits for insertion of a coin or a prepaid card by the user, and when the insertion is made, the computer causes the coin processing portion 30 or the prepaid card processing portion 31 to execute the charging processing.

In this charging processing as well, it is designed such that the user can also make a cancel operation. In the case where the user makes the cancel operation, or a predetermined time has elapsed while the fee payment has not been made, the computer 20 determines that the charging processing is NG and proceeds from step F132 to step F133, and returns the disk 90 inserted by the user. That is, the computer 20 instructs the disk transfer mechanism 22 to transfer the disk 90 loaded on the disk drive 24 at that point of time to the disk ejection portion 13.

As shown by ①, the computer 20 completes the processing and returns to step F101.

When the fee payment is properly carried out and the charging processing becomes OK, the computer 20 proceeds from step F132 to step F134.

Here, the computer 20 confirms whether or not the disk 90 in which the set content is recorded exists in the disk stocker 23. That is, stock confirmation is made.

If the objective disk 90 exists in the disk stocker 23, 2 the computer 20 controls the disk transfer mechanism 22 at step F135 so that the disk 90 is taken out from the disk stocker 23 and is transferred to the disk ejection portion 13. That is, by this, the user can receive the disk 90 in which the desired content is recorded. In this case, for the user, the common disk 90 is exchanged.

At step F134, in the case where it is determined that the objective disk 90 does not exist in the disk stocker 23 from such circumstances as sold out, the computer 20 proceeds to step F136, and controls the disk transfer mechanism 22 so that a not-downloaded disk is taken out from the disk stocker 23 and is loaded on the disk drive 24.

At this point in time, since the disk 90 inserted by the user is loaded on the disk drive 24, the computer causes the disk transfer mechanism 22 to previously transfer the disk 90 from the disk drive 24 to take shelter. For example, such a method may be adopted that a housing section for shelter is provided in the disk stocker 23, the disk transfer mechanism 22 or the like, and the disk is transferred there.

When the not-downloaded disk is loaded on the disk drive 24, the computer 20 instructs the disk drive 24 to make a record operation, supplies content data stored in the HDD 21 to the disk drive 24, and causes the objective content to be downloaded and recorded into the disk 90 loaded on the disk drive 24.

The computer 20 causes recording of the content also in this case to be executed at the position indicated by the pointer recorded in the disk 90.

At step F137, the computer 20 renews the file management information (see FIG. 2B) of the disk 90 according to the download recording of the content, and enables the content to be reproduced by an apparatus at the user side.

Further, at step F138, the computer 20 renews (increment) the history information (information of download times) of the disk 90, and renews the value of the pointer to a value indicating a writing position address at the next download.

By the processing at steps F136, F137, and F138, the content desired by the user have been downloaded into some not-downloaded disk. Then the computer 20 controls the disk transfer mechanism 22 at step F139, so that the disk 90 is taken out from the disk drive 24 and is transferred to the disk ejection portion 13. That is, by this, the user can receive the disk 90 in which the desired content is recorded. The user receives the common disk which is exchanged for the inserted common disk.

At this point in time, the disk first inserted by the user is made to remain in the disk drive 24 (or the housing section for shelter).

The processing to this disk is performed at step F140 and the following.

First, at step F140, the computer 20 confirms the history information among the exhibit information of the disk 90 read at step F104, that is, the information of the past download times, and determines whether the number of the download times is the prescribed number of times or more.

In the case where the number of the download times is the prescribed number of times or more, it is conceivable that the disk 90 is exhausted since it has been used a considerably large number of times, and as a result, the reliability of future data recording and reproduction may be decreased.

Thus, the computer 20 proceeds to step F146, recognizes that the disk is a waste disk, and causes the disk to be housed as a waste disk in the disk stocker 23. That is, the computer 20 causes the disk transfer mechanism 22 to transfer the disk to the housing position of the waste disk. Then the computer 20 completes the processing and returns to step F101.

In the case where the number of the download times does not exceed the prescribed number of times, the computer 20 determines that the disk 90 can be still used.

Here, the computer 20 proceeds to step F141 (in the case where the disk is put in the housing section for shelter, it is transferred to the disk drive 24), and executes the initializing processing of the disk 90. However, this initializing processing is initializing as to download data, and the number of the download times is not naturally rewritten.

After completing the initializing (erasing) of the download data, the computer 20 determines at step F142 whether or not there is content which require replenishing. That is, the computer 20 determines whether or not there are disks in which some content is recorded and the number of stocks in the disk stocker 23 is small.

If there are plenty of stocks for disks of any content, the computer 20 controls the disk transfer mechanism 22 at step F145, so that the disk in which the download data have been initialized is stored as a not-downloaded disk in the disk stocker 23. Then the computer 20 completes the processing and returns to step F101.

In the case where the stock of the disk recording some content runs short (or no stock), the computer 20 prepares the disk 90 recording the content at step F143. That is, the computer 20 instructs the disk drive 24 to record, supplies the disk drive 24 with the download data which require replenishing, and causes the disk drive 24 to download the download data to the initialized disk 90. Although not shown in the flowchart, in the case of this download as well, the renewal of file management information, history information, and the pointer as in the steps F137 and F138 is carried out.

By the download at step F143, when the disk 90 requiring replenishing is produced, the computer 20 controls the disk transfer mechanism 22 at step F144, and causes the disk, as a disk in which the specific content is recorded, to be housed at a predetermined position of the disk stocker 23. Then the computer 20 completes the processing and returns to step F101.

Figure 9:
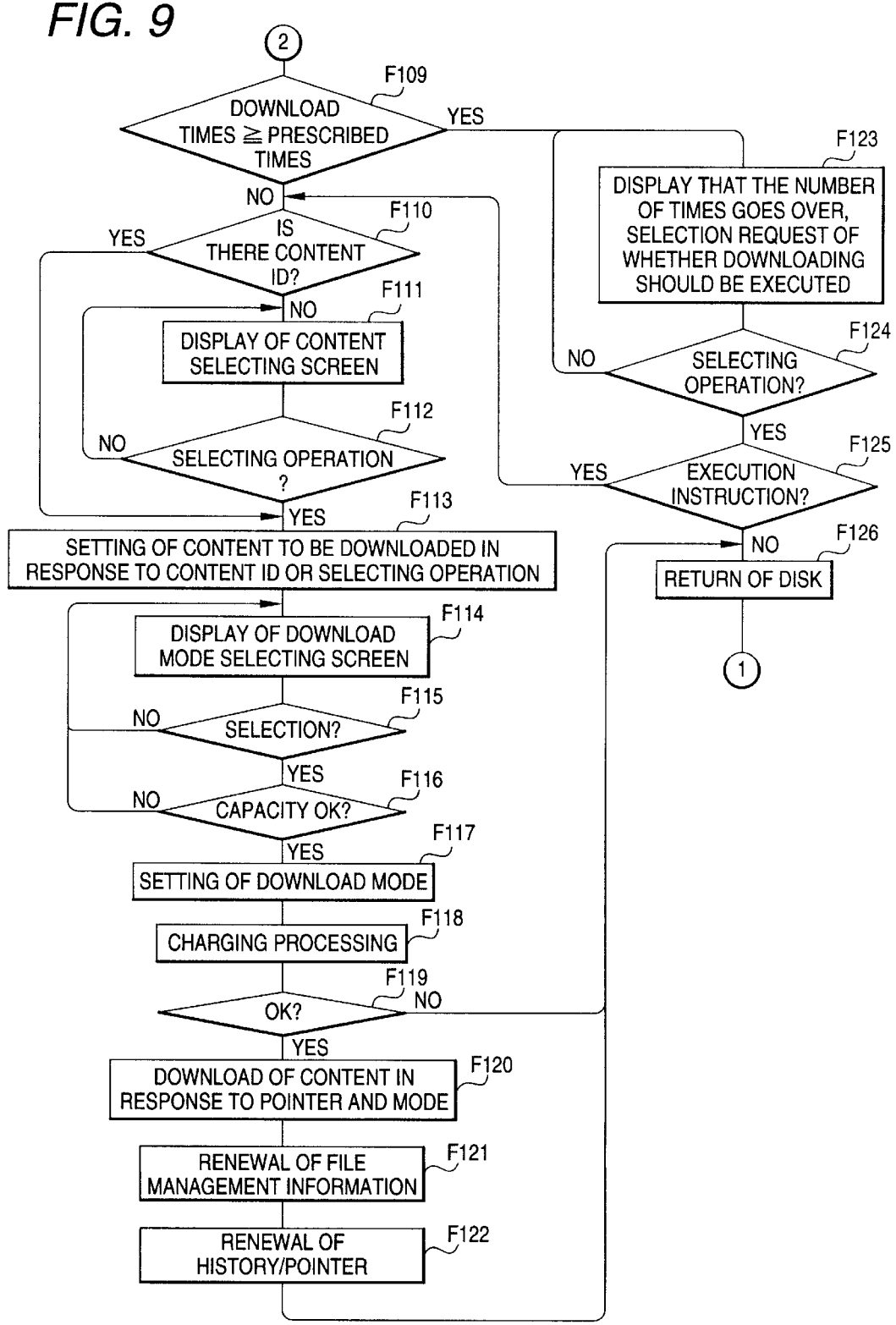
FIG. 9 is a flowchart of processing of the disk adaptive type information providing apparatus of one embodiment of the present invention.

Next, in the case where the user inserts the personal disk 90, that is, processing in the case where the computer proceeds from step F108 of FIG. 8 to step F109 of FIG. 9 and the following will be described.

First, at step F109, the computer 20 confirms the history information among the exhibit information of the disk 90 read at step F104, that is, the information of the past download times, and determines whether or not the number of the download times is the prescribed number of times or more.

Similar to the case of the common disk, in the case where the number of the download times is the prescribed number of times or more, it is conceivable that the personal disk 90 is exhausted since it has been used a considerably large number of times, and as a result, the reliability of future data recording and reproduction is may be decreased. However, since it is the disk 90 owned by the user, it is impossible to discard the disk. Thus, in the case where the number of the download times is the prescribed number of times or more, the computer 20 proceeds to step F123, and causes the display portion 11 to display that there is a possibility that the reliability is lowered since the number of the download times goes over.

Then the computer urges the user to select whether or not download should be made in this disk 90 as it is.

In response to this, the user makes the selecting operation of execution instruction or cancellation. In the case where the selecting operation is made, the computer 20 proceeds from step F124 to step F125, and determines whether or not the execute instruction was made. When the cancellation instruction was made, the computer proceeds to step F126 to instruct the disk transfer mechanism 22 to return the disk. That is, the computer 20 causes the user's personal disk loaded on the disk drive 24 at the point of time to be ejected from the disk ejection portion 13.

On the other hand, in the case where the user made the execution instruction, the computer 20 proceeds to step F110.

In the case where the inserted personal disk 90 is such that the number of the download times does not exceed the prescribed number of times, or in the case where although the number of the download times is the prescribed number or more, the execution instruction has been made by the user, subsequently at step F110, the computer 20 confirms whether or not the content ID exists among the read exhibit information.

In the case where the content ID is not recorded, at step F111, the computer 20 causes the display portion 11, as a content selection screen, to display a menu of content which can be purchased and a request for selection.

The computer 20 waits for a selecting operation of the user while causing the display portion 11 to make display at step F111, and when the selecting operation of some content is made, the computer proceeds from step F112 to step F113. The computer 20 determines the contents of the selecting operation, and sets the selected content as the content to be downloaded.

On the other hand, in the case where the content ID is recorded, the computer 20 proceeds directly from step F110 to step F113. The computer 20 sets the specific content indicated by the content ID as content to be downloaded.

In this embodiment, in the case where the personal disk 90 is used, it is designed such that a download mode can be selected.

The download mode is such that it is possible to select whether the past downloaded data are kept to be stored, or the past downloaded data are erased. Moreover, as described above, the download mode may be made such that the level of data contents, the language of the data, and the like can be selected.

For the selection of the download mode, at step F114, the computer 20 causes the display portion 11 to display the mode selection screen and waits for the user's operation. When the selecting operation is made, the computer 20 proceeds from step F115 to step F116, and checks the capacity of the disk 90. This relates to especially the case where the mode of holding the past download data has been selected, and becomes processing to check whether there remains a capacity capable of executing the download of this time while the past download data are held.

If it is determined that the capacity is insufficient, the computer 20 returns to step F114, and causes the display portion 11 to display that the capacity is insufficient, so that the user is urged to again select the mode.

In the case where the mode to erase the past download data is selected, or in the case where it is determined that such capacity remains that download at this time can be made even if the past download content remain, the computer 20 proceeds to step F117, and sets the download mode in accordance with the selection.

Subsequently, the computer 20 makes charging processing at step F118. That is, the computer 20 exhibits the fee of the content set at step F113 (there can be a case where the fee is different according to the download mode set at step F117) to the user through the display portion 11, and requests the user to pay the fee. The computer 20 waits for insertion of a coin or a prepaid card by the user, and when the insertion is made, the computer causes the coin processing portion 30 or the prepaid card processing portion 31 to execute the charging processing.

In the case where the personal disk 90 is used, the user can also select payment by registration of a credit card. In that case, as user identification processing, for example; an input request of user ID (personal identification number), input processing, check processing through communication to the server 2, and the like are carried out.

Incidentally, at this charging processing, it is designed such that the user can also make a cancel operation. In the case where the user makes the cancel operation, or in the case where a predetermined time has elapsed while the fee payment has not been made, the computer 20 determines that the charging processing is NG, proceeds from step F119 to step F126, and returns the disk 90 inserted by the user. Then the computer 20 completes the processing and returns to step F101.

When the fee payment is properly made, and the charging processing becomes OK, the computer 20 proceeds from step F119 to step F120.

Here, the computer 20 downloads the set content into the personal disk.

That is, the computer 20 gives recording operation instructions to the disk drive 24, supplies the content data stored in the HDD 21 to the disk drive 24, and causes the objective content to be downloaded and recorded in the disk 90 loaded on the disk drive.

Recording of the content in this case is also executed at the position indicated by the pointer recorded in the disk 90.

Recording of the content, erasing of the past content, and the like are executed in accordance with the set download mode.

At step F121, the computer 20 renews the file management information (see FIG. 2A) of the disk 90 according to the download record of the content, and enables the content to be reproduced by an apparatus at the user side.

Further, at step F122, the computer 20 renews (increment) the history information (information of download times) of the disk 90, and renews the value of the pointer to a value indicating a writing position address at the next download time.

By the processing at the steps F120, F121, and F122, the content desired by the user are downloaded into the user's own personal disk. The computer 20 proceeds to step F126 and controls the disk transfer mechanism 22, so that the disk 90 is taken out from the disk drive 24 and is transferred to the disk ejection portion 13. That is, in this manner, the user makes the desired content downloaded into the user's own personal disk 90 and can receive the disk.

Then the computer 20 completes the processing and returns to step F101.

As described above in FIGS. 8 to 11, although the processing of the information providing apparatus 1 is performed, this processing example is merely one example.

In the case of this processing example, the user can get desired content through a desired procedure among the procedures explained in FIGS. 7A to 7C.

That is, according to the preference of the user, the user can get the disk in which the desired content is recorded, as the personal disk 90 or the common disk. In the case where the personal disk is used, since download is made without fail, the user must wait during the time required for the download. However, in the case of the common disk 90, since it is generally taken out from the disk stocker 23 and is provided to the user, the user can immediately get the disk without a waiting time.

Further, in the case of the processing example, in any of the personal disk 90 and the common disk 90, the disk 90 can be repeatedly used until it is determined that there is a fear of deterioration in performance since the number of the download times is the prescribed number of times or more. Thus, there is an advantage that it is possible to prevent the disk to be wasted, and further, it becomes very preferable in providing mode of content in which data are renewed every day or every week, such as a newspaper or magazine.

Needless to say, that this apparatus can be used as an information providing apparatus which provides not only the newspaper or magazine, but also content such as music, picture, and application software.

Besides, in this embodiment, since the touch panel operation system on the display screen is adopted, it is unnecessary to dispose a number of operation keys and the like on the information providing apparatus 1, and it is possible to realize simplification of the structure of the terminal.

Particularly, when the operation keys and menu images for the touch panel operation are displayed in accordance with the advance of the operation, it is possible to make the operation plain for the user.

In the case where download is made to the disk 90, it is executed to the address indicated by the pointer. The value of the pointer is rewritten at each time of execution of download, so that it is possible to avoid such a case that the download is repeated using the same region on the disk every time. By this, it is possible to prevent exhaustion of the disk 90 from being accelerated, and the disk 90 can be effectively used for a longer period of time.

Besides, with this, the prescribed number of the download times (maximum number of times) as the standard of determination at steps F109 and F140 can be set high.

Incidentally, the prescribed number of times as the standard to the personal disk at step F109 and the prescribed number of times as the standard to the personal disk at step F140 may be set at different values.

Besides, in this embodiment, in the case where the personal disk is inserted, another disk is normally supplied to the user, and the inserted disk is collected. If the collected disk is usable by the processing at steps F140 to F145, it is reused as stock. Particularly, according to the stock state, necessary content is downloaded and is replenished.

By this, there does not often occur a case where the stock of disks of some content disappears in the disk stocker 23, and almost all cases become affirmative results at steps F134 and F152. That is, for the common disk, there does not often occur a case where download is made while making the user wait.

In the case where the personal disk is used, since the download mode can be selected, download in accordance with the circumstances of the user can be realized.

As processing examples, further various examples are conceivable.

For example, a processing example is also conceivable where if the content ID is recorded, the user can select the content.

Besides, in the foregoing description, for example, although the initial screen is displayed when the apparatus is not used, it is conceivable that various kinds of display other than the initial screen are made when the apparatus is not used. Alternatively, it is conceivable that various kinds of image display are made together with icons or the like for selection as the initial screen.

For example, when pictures which are to function as a screen saver, pictures for various advertisements, image pictures according to the set place, demonstration pictures, and the like are displayed, it is possible to make the system more interesting and have high additional values. Additionally, it is also possible to allow the use by the user free by keeping advertisement pictures displayed.

Moreover, it is also conceivable that as an example of contents to be downloaded, not only the objective content but also data such as advertisement pictures can be downloaded. In this case, by adding the advertisement, it is also possible to make the downloaded content free.

In the case of the system where the information providing apparatus 1 can be used free of charge, the fee insertion processing, the charging processing, and the like are not executed.

6. Structure of an IC card adaptive type information providing apparatus

Next, as the information providing apparatus 1 of this embodiment, an IC card adaptive type information providing apparatus will be described.

Figure 12:
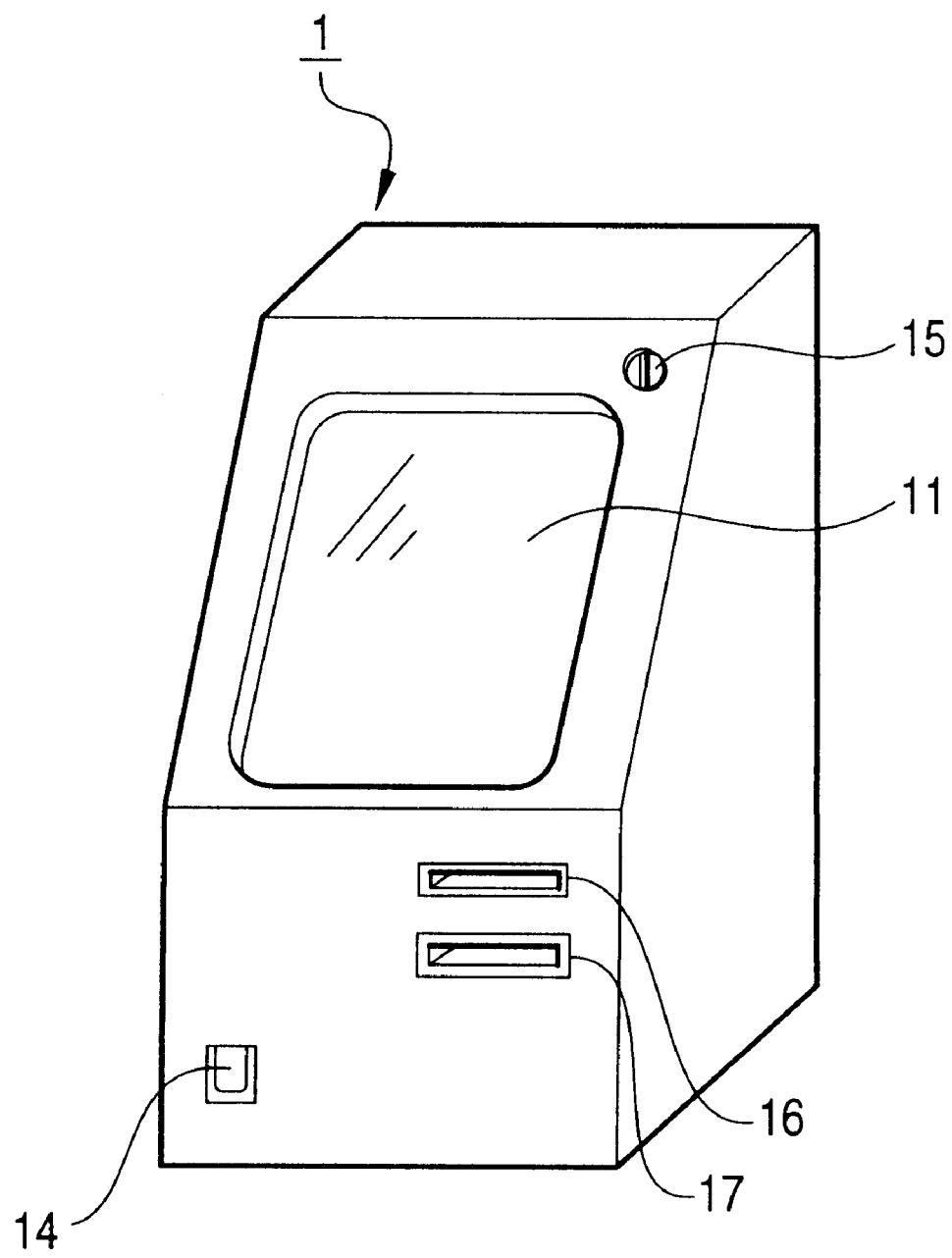
FIG. 12 is an explanatory view of an example of an outer appearance of an IC card adaptive type information providing apparatus of an embodiment of the present invention.

FIG. 12 shows an example of an outer appearance of an IC card adaptive type information providing apparatus 1, and FIG. 13 shows an inner structure of the IC card adaptive type information providing apparatus 1. In FIGS. 12 and 13, the same parts as those of the disk adaptive type information providing apparatus 1 described in FIGS. 4 and 5 are denoted by the same reference numerals, and their explanation will be omitted.

The information providing apparatus 1 of FIG. 12 is also set at a store or the like on the assumption that the public use it, and in this example, the outer appearance is, for example, similar to a general public telephone.

In a display portion 11 using a liquid crystal panel or a cathode ray tube (CRT), various kinds of image display at the use of the information providing apparatus 1 are performed, and display of operation keys and a menu is made so that a touch operation using a touch sensor 33 is made possible.

An IC card medium adapted to the IC card adaptive type information providing apparatus of this example is made only for the personal IC card (personal IC card 91 or IC card 91V with a viewer). That is, the user purchases a personal IC card in advance, and then, uses the information providing apparatus 1.

Incidentally, similar to the foregoing disk adaptive type information providing apparatus, it is naturally possible to design such that a common IC card which is used for many unspecified people is prepared, and the card is made usable in a rental system (exchange system at the time of use) like the foregoing common disk.

In this example, when the medium is made only the personal IC card 91 (or personal IC card 91V with a viewer), at the use of the information providing apparatus 1, the IC card 91 (or IC card 91V with a viewer; hereinafter omitted) owned by the user is loaded without fail.

Thus, a card connector portion 17 is provided as a portion where the IC card 91 is loaded.

When the user inserts the IC card 91 into the card connector portion 17 by a card drive 26 shown in FIG. 13, the information providing apparatus 1 can be configured to perform recording and reproducing to the IC card 91.

As is understood from FIG. 13, although the example of the inner structure is made almost the same as the foregoing disk adaptive type information providing apparatus 1, since it is an example for only the personal IC card 91 as an object, the mechanism for medium exchange or stock (disk transfer mechanism 22, disk stocker 23, and the like in FIG. 5) becomes unnecessary.

The card drive 26 exchanges information to the computer 20 through an IC card interface 32. That is, the card drive 26 receives recording instructions, reproducing instructions, and supply of download data from the computer 20 through the IC card interface 32, and at reproduction, transfers data read from the IC card 91 to the computer 20 through the IC card interface 32.

Although other parts of the information providing apparatus 1 of FIG. 13 are made the same as those of FIG. 5, of course, similar to the case explained in FIG. 5, various modified examples of the structure are conceivable.

7. Use procedure to an IC card adaptive type information providing apparatus

Figure 14:
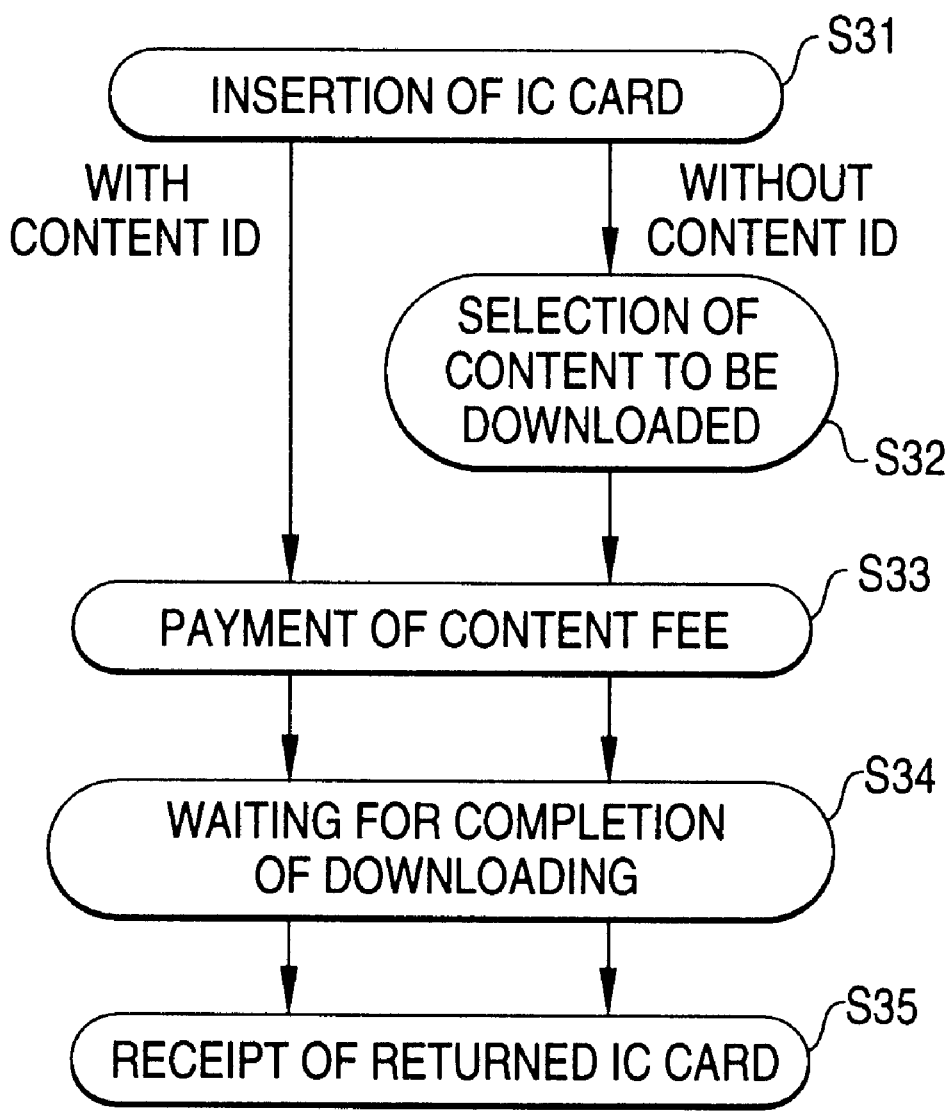
FIG. 14 is an explanatory view of use procedures of the IC card adaptive type information providing apparatus of one embodiment of the present invention.

A basic use procedure of the user to the IC card adaptive type information providing apparatus 1 will be described with reference to FIG. 14.

In the case where the user uses the information providing apparatus 1, the user uses the user's own personal IC card 91, and the procedure becomes as shown in steps S31 to S35.

The user first inserts the personal IC card 91 into the card connector portion 17 (S31).

Here, the procedure becomes different according to whether the content ID (see FIG. 2A) is recorded in the IC card 91.

If the content ID is recorded (that is, if the user recorded the content ID indicating some specific content), since the information providing apparatus 1 (computer 20) determines that the content indicated by the content ID are the content which the user desires, it becomes unnecessary for the user to select the content which the user desires to purchase. On the other hand, in the case where the content ID is not recorded, the computer 20 causes the display portion 11 to make display to request the user to select desired content from a menu of content which can be purchased. The user selects the content which the user desires to purchase by a touch operation (S32).

The user subsequently inserts a coin or a prepaid card as a fee payment processing (S33). For example, the fee corresponding to the selected and set content is displayed on the display portion 11, and in response to the request for payment of the fee, the user makes the payment of the fee.

Since the personal IC card is used, the fee of the IC card itself is not naturally included.

If the user makes credit card registration to the constitution as the server 2, it is also possible to make payment through the credit card registration.

In the case where payment through the credit card registration is made, at the payment of the fee, for identification processing of whether charging to the credit is to be made, input of the user ID or the like is carried out.

When the fee is paid, the computer 20 executes download of the selected and set content into the IC card 91 which is inserted by the user and is connected to the card drive 26. Thus, the user waits for completion of the download operation (S34). However, from the feature of the IC card that recording and reproducing can be made at very high speed, a waiting time is very short as compared with the download time to the disk medium, and actually, the waiting time of the user is merely an instant such that the user does not recognize the time as the waiting time.

When the download is completed, the computer 20 instructs the user to draw out the IC card since the download is completed. In response to this, the user draws out the IC card 91 from the card connector portion 17 (S35).

By the above procedure, download is executed to the personal IC card 91 inserted by the user, and it is returned to the user (content is sold).

That the content ID can be arbitrarily recorded by the user is the same as the case of the foregoing personal disk 90. Thus, for the user who desires to purchase the content of the same newspaper every day, when the content ID indicating the content is recorded, it becomes unnecessary to always make a selecting operation at the use of the information providing apparatus. Particularly, since the medium is the IC card medium in which download can be executed at high speed, in that case, the user can purchase the content very quickly and easily by merely inserting the IC card 91 into the information providing apparatus 1 and paying the fee.

Incidentally, in this example, it is designed such that selection of the download mode in the case of the foregoing personal disk 90 can not be made. In the case where download is executed into the IC card 91, it is designed such that the past download data are erased.

However, of course, such a method may be adopted that various modes are prepared so that the user can select them.

8. Processing of an IC card adaptive type information providing apparatus

The processing of the computer 20 of the information providing apparatus 1 which realizes the use in the foregoing procedure and which provides content requested by the user will be described with reference to flowcharts of FIGS. 15 and 16.

Figure 15:
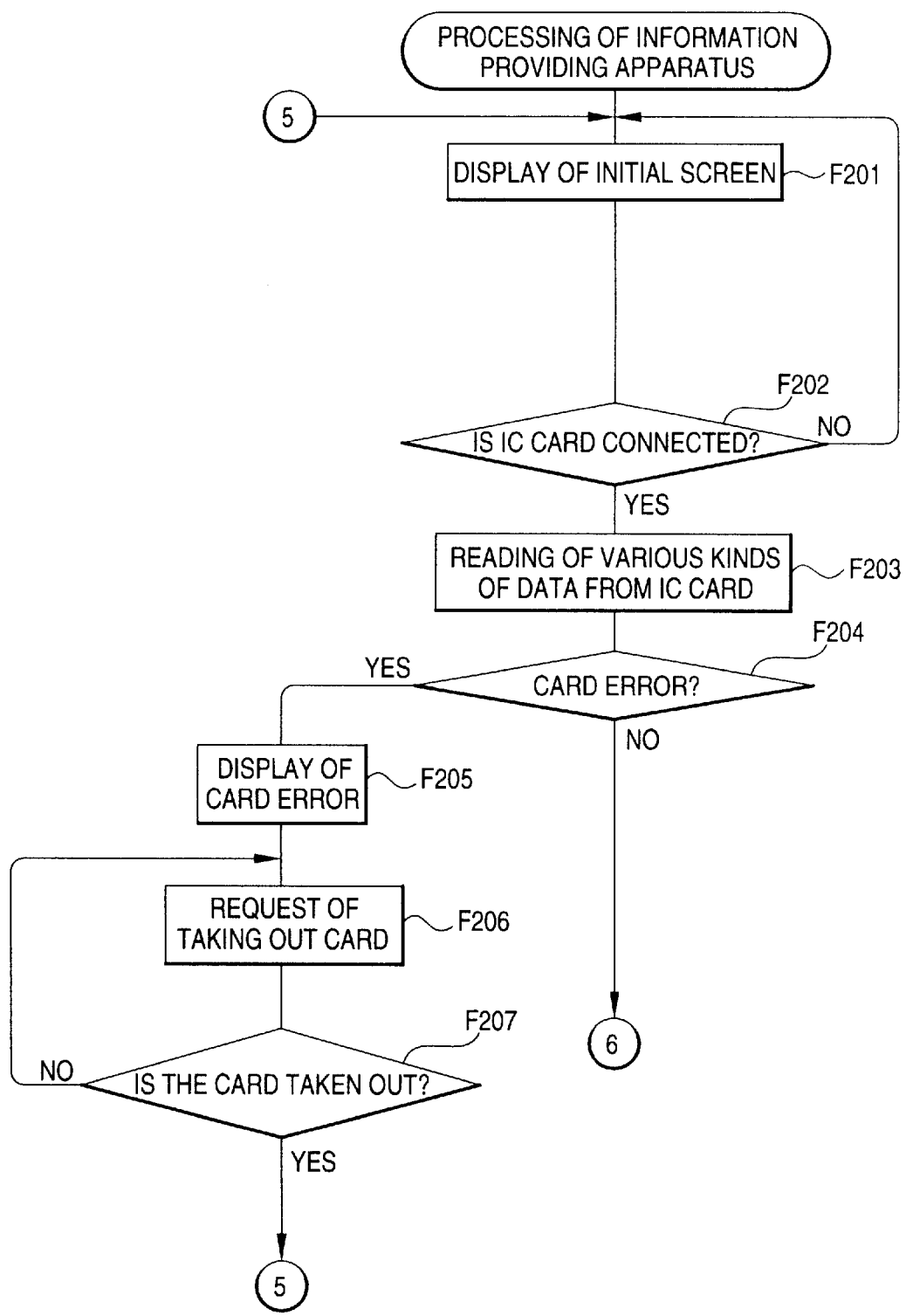
FIG. 15 is a flowchart of processing of the IC card adaptive type information providing apparatus of one embodiment of the present invention.

At step F201 of FIG. 15, the information providing apparatus 1 stands by in the state where the initial screen is displayed on the display portion 11.

As the initial screen, it is appropriate that display of a menu picture of content which can be purchased through the information providing apparatus 1, or a display to request insertion of an IC card is made.

The computer 20 makes monitoring processing of whether or not the IC card 91 is inserted and connected at step F202 in the state where the initial screen is displayed at step F201.

In the case where the user inserts the IC card 91 into the card connector portion 17, the computer 20 proceeds from step F202 to step F203.

First, the computer 20 gives data read instructions to the card drive 26 through the IC card interface 32 so that the exhibit information of the IC card 91 is read. That is, the identification code and other exhibit information explained in FIG. 2A are read.

Next, at step F204, the computer 20 confirms the adaptive medium identification code among the read exhibit information, and determines whether or not the inserted IC card is an IC card adapted to the information providing apparatus 1.

In the case where a suitable adaptive medium identification code can not be detected, the computer 20 determines that the IC card is one which is not adapted to the information providing apparatus 1 (IC card error).The computer proceeds from step F204 to step F205 and causes the display portion 11 to display the IC card error to notify the user of the card error, and requests the user to take out the IC card at step F206. When the user draws out the IC card and receives it, the computer 20 completes the processing from step F207 and returns to step F201 as indicated by ⑤.

Figure 16:
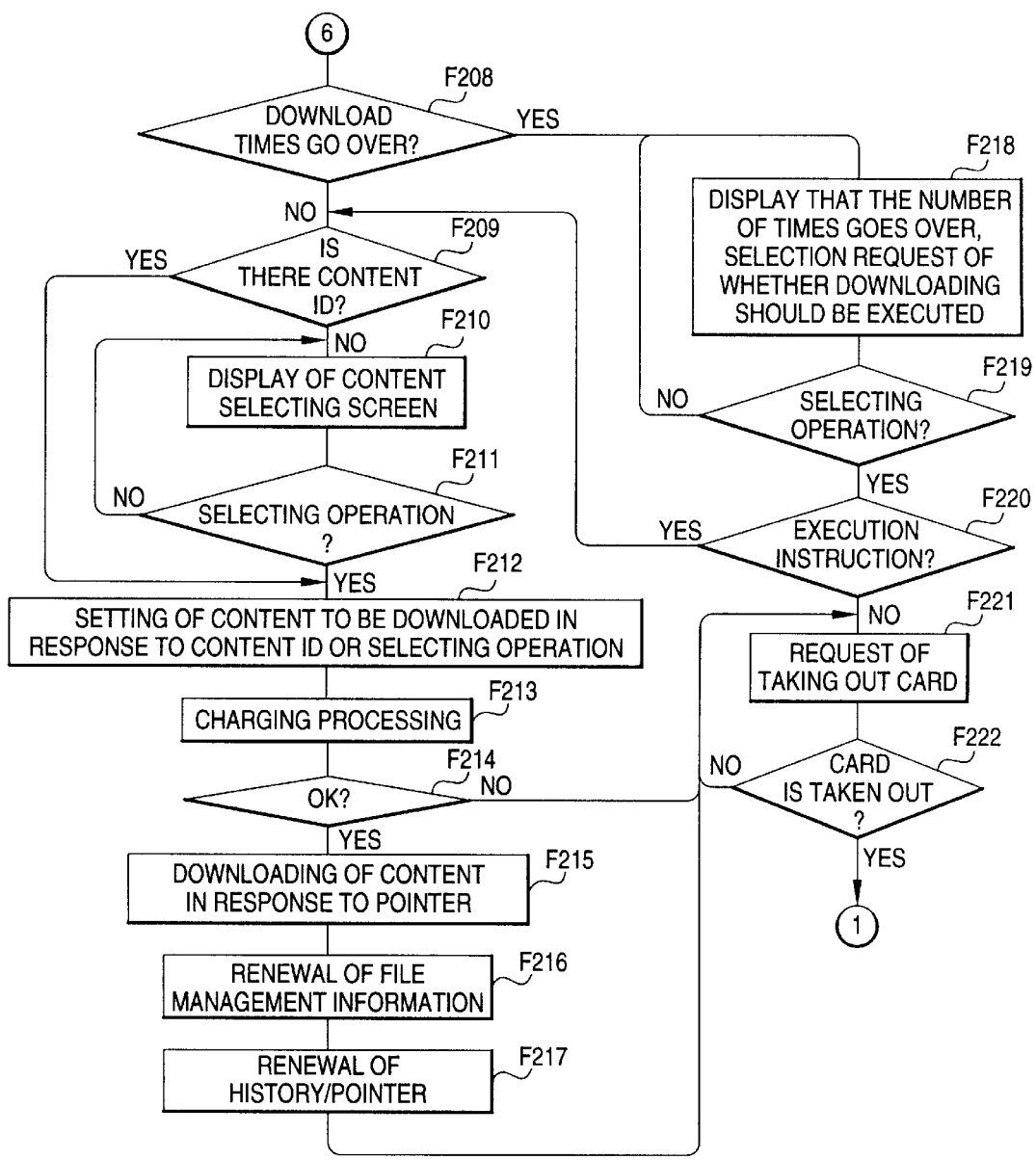
FIG. 16 is a flowchart of processing of the IC card adaptive type information providing apparatus of one embodiment of the present invention.

In the case where the identification code as to the inserted IC card is properly confirmed, the computer 20 proceeds from step F204 to step F208 of FIG. 16 as indicated by ⑥.

First, at step F208, the computer 20 confirms the history information among the exhibit information of the IC card 91 read at step F203, that is, the information of the number of the past download times, and determines whether or not the number of the download times is the prescribed number of times or more.

In the case where the number of the download times is the prescribed number of times or more, it is conceivable that the IC card 91 is exhausted since it has been used a considerably large number of times, and the reliability of data recording and reproduction is lowered after this.

Thus, in the case where the number of the download times is the prescribed number of times or more, the computer proceeds to step F218, and causes the display portion 11 to display such that the reliability is lowered since the number of the download times goes over.

The computer 20 causes the user to select whether or not download should be made into this IC card 91 as it is.

In response to this, the user makes a selecting operation of an execution instruction or cancellation instruction. In the case where the selecting operation has been made, the computer 20 proceeds from step F219 to step F220 and determines whether or not the execution instruction has been made. If the cancellation instruction has been made, the computer requests the user to take out the IC card at step F221. When the user draws out the IC card and receives it, the computer completes the processing from step F222, and returns to step F201 as indicated by ⑤.

On the other hand, in the case where the user has made the execution instruction in response to the selecting request at step F218, the computer 20 proceeds to step F209.

In the case where with respect to the inserted IC card 91, the number of the download times is less than the prescribed number of times, or in the case where although the number of the download times is the prescribed number of times or more, the user makes the execution instruction, at step F209, the computer 20 confirms whether or not the content ID exists among the read exhibit information.

In the case where the content IC does not exist, at step F210, the computer 20 causes the display portion 11 to display, as a content-electing screen, a menu of content which can be purchased and a request for selection.

The computer 20 waits for the selecting operation of the user while causing the display portion 11 to make display at step F210, and when the selecting operation of some content is made by the user, the computer proceeds from step F211 to step F212. Then the computer 20 determines the contents of the selecting operation, and sets selected content.

On the other hand, in the case where the content ID is recorded, the computer 20 proceeds directly from step F209 to step F212. Then the computer 20 sets the content indicated by the content ID.

Subsequently, the computer 20 performs charging processing at step F213. That is, the computer 20 causes the display portion 11 to exhibit the fee of the content set at step F212 to the user, and requests the user to pay the fee. The computer 20 waits for the insertion of a coin or a prepaid card by the user, and when the insertion is made, the computer causes the coin processing portion 30 or the prepaid card processing portion 31 to execute the charging processing.

In the case where the user selects payment by credit card registration, the computer 20 performs user identification processing, for example, input request of the user's ID (personal identification number), input processing, check processing through communication with the server 2, and the like.

At the time of the charging processing, it is designed such that the user can also make a cancellation operation. In the case where the user performs the cancellation operation, or in the case where a predetermined time has elapsed and the fee payment has not been made, the computer 20 determines that the charging processing is NG and proceeds from step F214 to step F221, and requests the user to take out the card. When the user takes out the inserted IC card 91, the computer 20 completes the processing from step F222 and returns to step F201.

When the fee payment is properly made and the charging processing becomes OK, the computer 20 proceeds from step F214 to step F215.

Here, the computer 20 downloads the selected and set content into the IC card 91.

That is, the computer 20 gives recording operation instructions to the IC card drive 26, supplies the content data stored in the HDD 21 to the IC card drive 26, and causes the content to be downloaded and recorded in the IC card 91 connected to the IC card drive 26.

The record of the content in this case is executed at the address position indicated by the pointer recorded in the IC card 91.

Erasing of the past content is also executed at the same time.

At step F216, the computer 20 renews the file management information (see FIG. 2A) of the IC card 91 according to the download record of the content, and enables the content to be reproduced by an apparatus at the user side.

Further, at step F217, the computer renews (increment) the history information (information of the number of download times) of the IC card 91, and renews the value of the pointer to a value indicating a writing position address at the next download.

By the processing at steps F215, F216, and F217, the content desired by the user are downloaded to the user's own personal IC card. The computer 20 proceeds to step F221 and requests the user to take out the card, and when the user takes out the inserted IC card 91, the computer completes the processing from step F222, and returns to step F201.

Although the processing of the information providing apparatus 1 is carried out as described above in FIGS. 15 and 16, the processing example is merely one example. For example, as in the foregoing disk adaptive type information providing apparatus, a common IC card which is used for many people is prepared, and its corresponding processing is carried out, or such modification may be made that download modes can be selected at download.

In the IC card adaptive type information providing apparatus of this example, the user can get desired content by loading the IC card 91.

That is, similarly to the case where the personal disk 90 is used in the case of the foregoing disk adaptive type information providing apparatus, effective use of the medium and easy acquisition of content become possible.

Further, in the case of the IC card, since the writing time of the download data is very short, it is possible to make the waiting time of the user almost zero.

Besides, since download of content to the IC card 91 is executed at the address indicated by the pointer, when the value of the pointer is rewritten at each time of execution of download, it is possible to prevent the download from being repeated using the same region on the IC card every time. By this, it is possible to prevent exhaustion of the IC card 91 from being accelerated, and the IC card can be effectively used for a longer period of time.

Besides, with this, the prescribed number of download times (maximum number of times) as the standard of determination at step F208 can also be set high.

9. Processing of inventory adjustment

Figure 17:
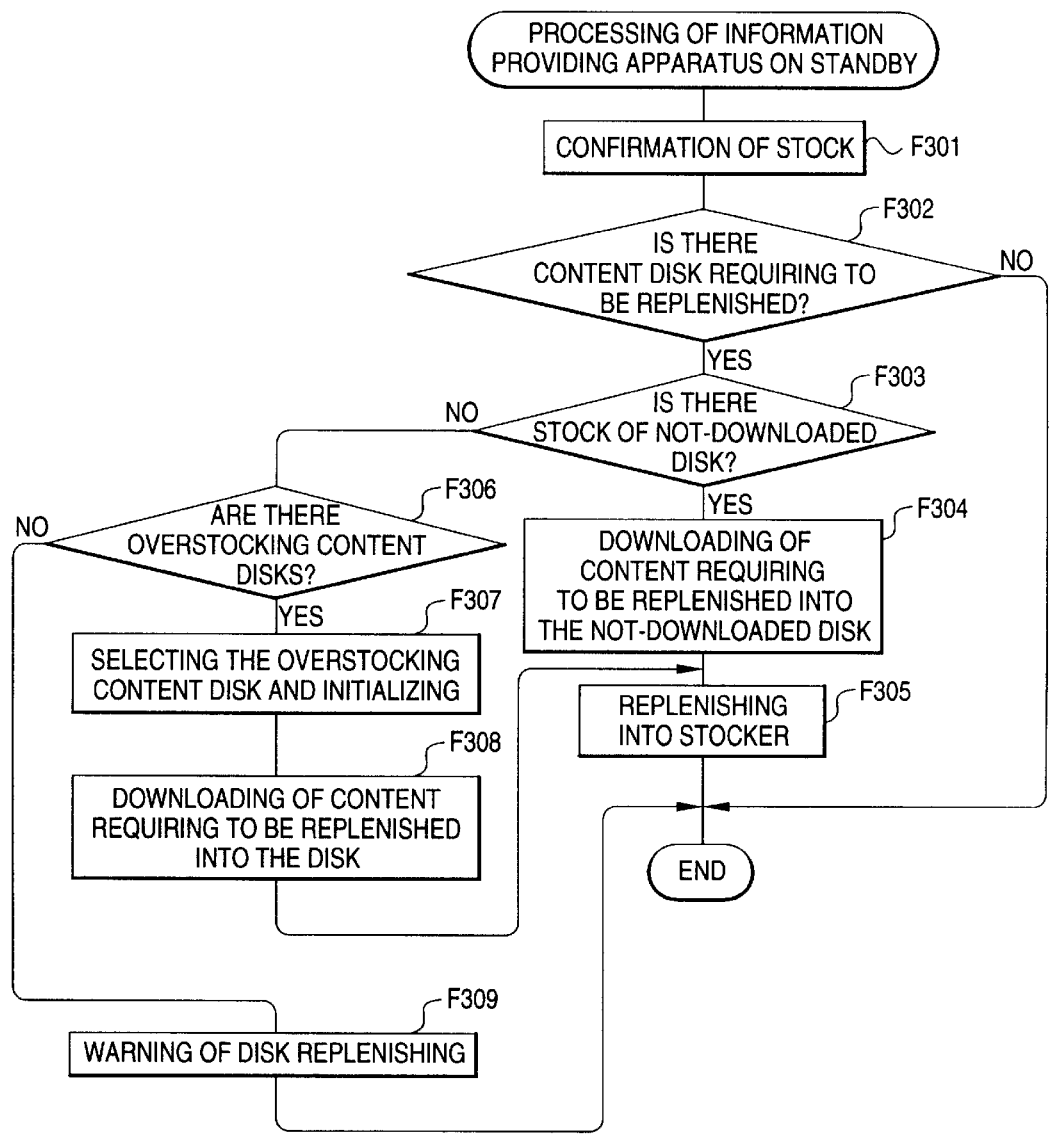
FIG. 17 is a flowchart of inventory adjustment processing of one embodiment of the present invention.

Here, the processing described in FIGS. 8 to 11 is processing in the case where the user makes purchase operations to the information providing apparatus 1. In the following embodiment, processing as shown in FIG. 17 is carried out during the period when this information providing apparatus 1 is not used by the user (during the standby period), and inventory adjustment in the disk stocker 23 is automatically carried out.

During the standby period, the computer 20 starts processing from step F301 whenever necessary. First, at step F301, the computer 20 confirms the number of stocks of content disks (disks in which some content has been downloaded) in each shelf in the disk stocker 23. That is, the computer 20 sets the prescribed number of stocks, and determines whether or not there is a shelf 91 in which the number of content disks housed in the shelf does not reach the prescribed number of stocks.

If there is no shelf 91 which is short of stock, the computer 20 completes the processing from step F302.

However, in the case where there is a shelf 91 which is short of stock and requires replenishing, the computer 20 proceeds from step F302 to step F303. For example, in the disk stocker 23 of FIG. 6, in the case where the content disks for the B newspaper run short, the computer 20 performs processing to replenish the content disks of the B newspaper.

First, step F303, the computer 20 confirms whether or not the stock as a not-downloaded disk (disk in the state in which content has been initialized) exists in the disk stocker 23.

If there is a not-download disk, the computer 20 proceeds to step F304, and carries out download of the content (for example, data of the B newspaper) necessary for replenishing into the not-downloaded disk.

That is, the computer 20 first controls the disk transfer mechanism 22 so that the not-downloaded disk is loaded on the disk drive 24.

The computer supplies the disk drive 24 with recording instructions and download data necessary for replenishing, and causes the disk drive 24 to download the download data to the disk 90. Although not shown in the flowchart, also in this download, the renewal of the file management information, and the renewal of the history information and the pointer as in the foregoing steps F137 and F138 are carried out.

By the download at step F304, when the disk 90 necessary for replenishing is produced, the computer 20 controls the disk transfer mechanism 22 at step F305, so that the disk, as a disk in which specific content is recorded, is housed at a specific position in the disk stocker 23. By this, the content disk is replenished in the shelf 91 which is short of stock. Then the computer 20 completes the processing.

On the other hand, at step F303, when the computer determines that there is no not-downloaded disk in the disk stocker 23, the computer proceeds to step F306, and confirms whether or not there is a shelf 91 which is overstocked. Specifically, the computer 20 confirms whether or not there is a shelf 91 in which the number of disks in stock is a maximum value or more. That is, the computer searches the content disks which are not sold very much.

If there is such a shelf 91, the computer 20 proceeds to step F307, and takes out the overstocked content disks. Specifically, the computer 20 selects the content disk in the shelf 91 in which the stock is the largest.

For example, in the case where the content disks of the E newspaper are overstocked, the computer 20 first controls the disk transfer mechanism 22, so that the content disk of the E newspaper is loaded on the disk drive 24.

The computer 20 instructs the disk drive 24 to initialize the disk at step F307. This initializing is for the download data, and the number of download times and the like as the exhibit information are not rewritten.

Subsequently, at step F308, the computer 20 gives recording instructions to the disk drive 24, supplies download data (for example, data of the B newspaper) necessary for replenishing, and causes the disk drive 24 to download the download data to the disk 90. Although not shown in the flowchart, also in this download, the renewal of the file management information, and the renewal of the history information and the pointer as in the foregoing steps F137 and F138 are carried out. In the case of the disk in which the content ID is recorded, in response to the change of the content, the content ID is also rewritten.

When the disk 90 necessary for replenishing is produced by the download at step F308, at step F305, the computer 20 controls the disk transfer mechanism 22 so that the disk is housed at a predetermined position of the disk stocker 23 as a disk in which specific content is recorded and completes the processing. By this, replenishing of the content disk to the shelf 91 in which content disks run short is completed.

However, at steps F303 and F306, there is a case where it is determined that neither not-downloaded disk nor overstocked content disk exists.

In such a case, since the disk 90 necessary for replenishing can not be produced through download, the computer 20 proceeds to step F309 and gives a disk replenishing warning.

For example, the computer causes the display portion 11 to make warning display to the sales staff such as a store clerk. Alternatively, a warning sound may be produced.

After a store clerk or the like replenishes disks in response to such warning, inventory adjustment becomes possible through the processing of FIG. 17 as the need arises.

Incidentally, in the processing of FIG. 17, the processing for producing the disk 90 necessary for replenishing may be carried out continuously to produce plural disks according to the number of stocks.

Besides, various examples are conceivable as processing examples. For example, it is also conceivable that disks other than not-downloaded disks are not used.

When such inventory adjustment is carried out, necessary content disks are replenished whenever necessary. Thus, the occurrence of such a state where disks of some content become out of stock in the disk stocker 23, that is, such a state that the user must wait a period of time to download at the time of purchase becomes minimum.

In this case as well, when download is made at steps F304 and F308, the download is executed to an address indicated by the pointer. Since the value of the pointer is rewritten each time the download is executed, it is possible to avoid such a state that download is repeated using the same region on the disk every time. By this, it is possible to prevent exhaustion of the disk 90 from being accelerated.

As processing of the information providing apparatus 1 on standby, there is also processing which accompanies the renewal of content.

As described above, there occurs a case whenever necessary that new content is transmitted from the server (for example, a daily newspaper is renewed every day), and in that case, it is necessary to rewrite all data as to the stocked content disks (that is, renewal data are downloaded).

Figure 18:
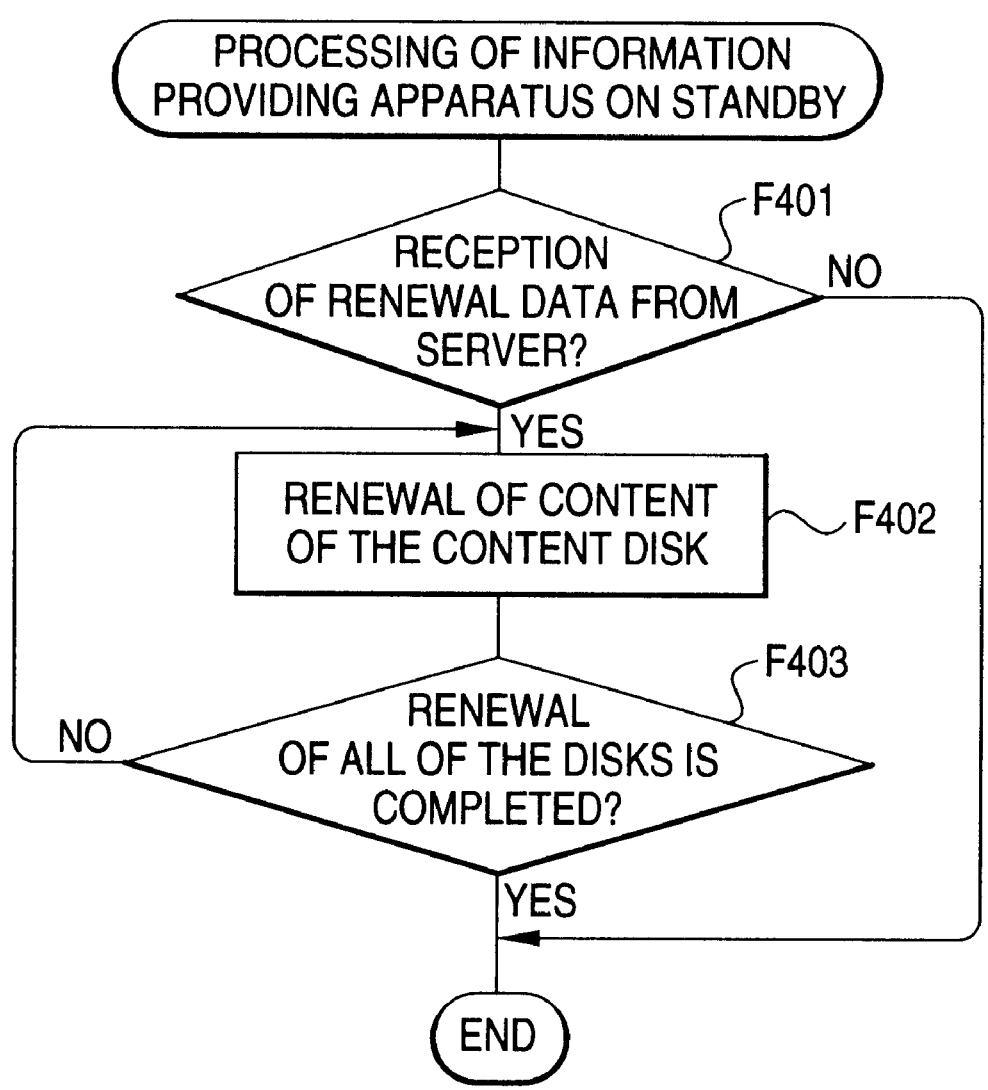
FIG. 18 is a flowchart of content renewal processing of one embodiment of the invention.

Thus, when renewal data are transmitted from the server, the computer 20 proceeds from step F401 of FIG. 18 to step F402.

That is, in the case where the renewal data as some content is taken into the HDD 21, the computer 20 proceeds to renewal processing to the disk in which the content is recorded.

For example, in the case where the renewal data of the A newspaper are received, at step F402, the computer controls the disk transfer mechanism 22, so that the content disk of the A newspaper is taken out from the disk stocker 24 and is loaded on the disk drive 24. After initializing the old content data if necessary, the computer 20 gives recording instructions to the disk drive 24, supplies renewal data, and causes the disk drive 24 to download new content data. Also in this download, the renewal of the file management information, and the renewal of the history information and the pointer as in the foregoing steps F137 and F138 are carried out.

After completing the download for renewal, the computer 20 controls the disk transfer mechanism 22, so that the disk is housed at the original predetermined position of the disk stocker 23.

For example, when the computer 20 executes this processing at step F402 to all the content disks of the A newspaper, and completes the renewal to all the stocked content disks of the A newspaper, the computer completes the processing from step F403.

Since such processing is carried out during the period of stand by, it is possible to provide the user with the newest information even in the case of the content which are, renewed at a short interval every day or every week.

Of course, this download for the renewal is also executed to an address indicated by the pointer, so that it is possible to prevent exhaustion of the disk.

10. Modified example

In the above embodiments, the exhibit information as shown in FIG. 2A or 2B is recorded as a data mode in the disk 90 or the IC card 91.

However, it is also conceivable that for example, the information of the content ID, the identification code, and the like is made to be capable of being identified by the shape or the like of the medium, and not by the data.

Figure 19A:
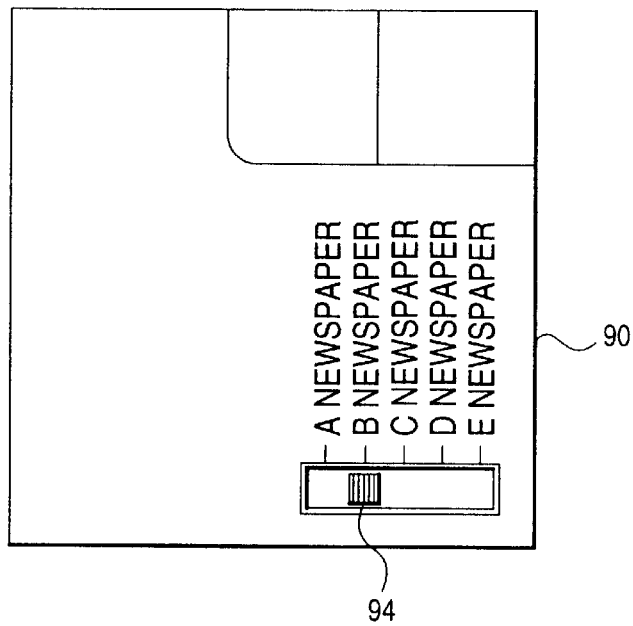
FIGS. 19A and 19B are explanatory views of a modified example of a recording medium of an embodiment of the present invention, respectively.

For example, FIG. 19A shows an example in which the content ID is indicated on the cartridge of the disk 90.

Now, when the information providing apparatus can selectively download the content as the A newspaper to the E newspaper, a slide lever 94 as shown in FIG. 19A is provided on the disk 90 adapted to the information providing apparatus 1.

This slide lever 94 is designed such that in the range of a slide groove, the user can arbitrarily slide the lever to the position corresponding to each of the A newspaper to the E newspaper.

The side of the information providing apparatus 1 is provided with a mechanism (for example, a mechanical switch mechanism or an optical detecting mechanism) for detecting a position at which the slide lever 94 is positioned in the range corresponding to the slide groove.

When the disk 90 in the state of FIG. 19A is loaded, the information providing apparatus 1 can recognize that the B newspaper is exhibited as the content ID, and it is possible to execute download of the content of the B newspaper without a content selecting operation by the user.

That is, the user has only to set the position of the slide lever 94 according to the content which the user desires to purchase.

Besides, in this case, it is easy to change the content ID, and this method is convenient, for example, at a time when the user desires to change the content to be purchased according to the feelings of the particular day.

Incidentally, modifications may be made that more detailed content can be selected by the slide lever 94. For example, such modification may be made that the political section, financial section, sports section, and the like of the newspaper can be selected by the slide lever 94, and only the content of the selected section are downloaded.

The selection of, for example, a newspaper as the content at this time has only to be made according to the content ID written as the exhibit information, or an input operation. Of course, two slider levers 94 for the selection of the newspaper and for selection of the section may be provided.

Further, such modification may be made that, for example, the content ID corresponding to the position of the slide lever 94 is stored in the RAM region in the medium as data, and at the side of the information providing apparatus 1, the data and the position of the slide lever 94 are made to correspond to each other, and some content is selected and set. By doing so, it is possible to change the option by rewriting data corresponding to the position of the slide lever 94.

For example, it becomes also possible to change the content of the option of the A newspaper to the E newspaper as set forth above to such option of the A newspaper, the C newspaper, the F newspaper, the G newspaper, and the H newspaper.

Figure 19B:
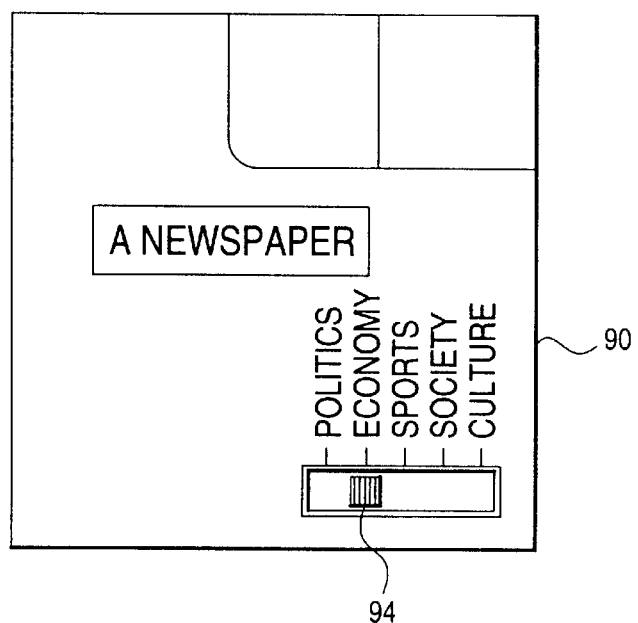

FIG. 19B shows a structural example in which information content which the user desires particularly to know can be selected by the slide lever 94.

For example, it is assumed that the disk 90 of FIG. 19B is for only the A newspaper. That is, it is assumed that the A newspaper is specified as the content ID.

Here, the slide lever 94 functions as a means for specifying the content which the user desires particularly to know. For example, it is designed such that the content of politics, economy, sports, society, culture, and the like can be selected.

Then, at the download, all the information as the A newspaper is downloaded, and further, more detailed content as to especially the content specified by the slide lever 94 are downloaded. As the more detailed article content, for example, such detailed information may be provided in advance, or information of the corresponding section of another newspaper may be added. For example, in the case of the state of FIG. 19B, in addition to all the information of the A newspaper, more detailed economic information is added and is downloaded.

Besides, such modification may be made that the content of the option can be changed by rewriting the corresponding data of the slide lever 94.

Figure 20A:
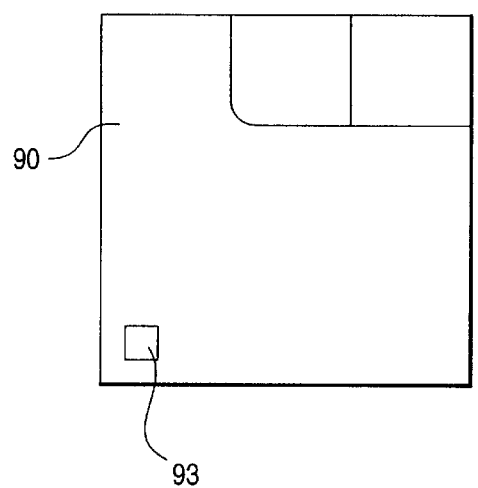
FIGS. 20A and 20B are explanatory views of a modified example of a recording medium of the one embodiment of the present invention, respectively.
Figure 20B:
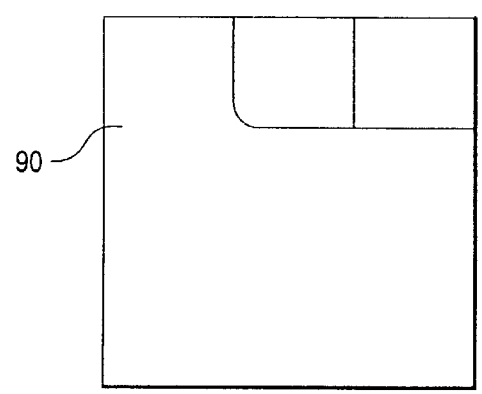

FIGS. 20A and 20B show an example in which exhibit information to discriminate a personal medium from a common medium is expressed by a hole of a cartridge of the disk 90.

For example, in this case, such discrimination is made possible that if a discrimination hole 93 exists at a specific position on the cartridge as shown in FIG. 19A, it is a common disk, and if such a hole does not exist as shown in FIG. 19B, it is a personal disk.

Similarly, the corresponding medium identification code may be exhibited as the shape of a cartridge. Further, in the case where the outer shape of a cartridge or a medium itself is made a specific shapes, and a recording medium of other shape can not be loaded in the information providing apparatus 1, there can be a case where the corresponding medium identification code becomes unnecessary.

Incidentally, the examples as described above can be naturally applied to the case of the IC card as well. That is, it is conceivable that a lever switch or a detecting hole is provided in a card receptacle, or a specific shape different from a normal IC card is formed.

Besides, although the information providing apparatus 1 of the foregoing examples can communicate with the server 2 as described above in FIG. 1, the information providing apparatus 1 which is not connected through a communication network is also conceivable.

Although the modified examples of the present invention have been described, modified examples of processing and structure are further variously conceivable.

As is understood from the above description, the present invention has the following effects.

According to the present invention, it is possible to realize an information providing apparatus in such a mode that a recording medium recording content which the user desires is sold to the user. That is, it is possible to realize an information providing apparatus in a mode like a vending machine which the public can use, and it is possible to make such a state that many unspecified people arbitrarily use the apparatus to get (purchase) a recording medium in which desired content is downloaded. In this manner, many people can receive information service of, for example, an electronic newspaper or an electronic magazine.

Moreover, since the selection of the content is made by the selecting operation of the user or the exhibit information of the recording medium loaded by the user, the selection by the user becomes simple, and the use is easy.

In the case where the selected and set download data are downloaded and recorded in a loaded recording medium and the recording medium is ejected, a sales mode of the content becomes such that the recording medium loaded by the user is used as it is. That is, since information is sold while using the recording medium such as the user's own disk or IC card as it is, effective use of the recording medium can be realized.

Besides, since the fee for the recording medium itself becomes unnecessary, there is also an advantage that the fee charged to the user can be inexpensive.

On the other hand, in the case where a recording medium in which the selected and set download data have been already recorded is taken out from stocked recording media and is ejected, and in the case where the user mounts the recording medium, the recording medium comes to be exchanged. In this case, the recording medium loaded by the user can be used after this, and the fee of the recording medium itself becomes unnecessary so that the fee charged to the user can be inexpensive.

Further, in the case of such an exchange system, the user can receive the recording medium where necessary content is recorded without waiting the time of execution of download. Thus, there is obtained a great merit that necessary information can be purchased very quickly.

Besides, according to the kind of recording medium recognized from the exhibit information of the recording medium when the recording medium is loaded, the control portion determines an operation control system of operations in which the recording medium, wherein the selected and set download data are recorded, is ejected from the ejection portion. For example, it determines whether the system is a returning system or an exchange system.

Thus, it is possible to make processing such that if the loaded recording medium is a personal recording medium, it is returned after downloading, while if it is a common recording medium, a stocked recording medium in which download has been already made is ejected. That is, proper operation processing can be made according to the kind of the recording medium.

Moreover, according to the present invention, in the case where the specific download data (content) are recognized from exhibit information on the recording medium, since the download data are selected and set, it is not necessary for the user to make a selecting operation of the content. Thus, the necessary content can be obtained quickly and accurately. For example, by merely loading the recording medium, renewed content (for example, information of a newspaper on that day) can be received.

In the case where specific content is not specified as the exhibit information, the content is selected and set according to the user's operation, which means that flexible processing can be made in accordance with the need of the user.

Moreover, according to the present invention, the selected and set download data are downloaded and recorded in the stocked recording medium, and the recording medium is ejected. Thus, the recording medium loaded by the user is exchanged, and in this case, the recording medium loaded by the user can be used after this. In this case as well, the fee of the recording medium itself becomes unnecessary, so that the fee charged to the user can be inexpensive.

Moreover, according to the present invention, in the case where the user does not mount the recording medium, the selection and setting of download data are carried out according to the input operation of the user. Since the recording medium in which the selected and set download data have been already recorded is taken out from the stocked recording media and is ejected, even if the user does not have the recording medium, the user uses the information providing apparatus and can get information.

Moreover, according to the present invention, it is designed such that in the case where the user does not mount the recording medium, the download data selected and set according to the input operation of the user are download and recorded in the stocked recording medium, and the recording medium is ejected. Thus, even in the case where the recording medium recording the content data desired by the user is out of stock, it becomes possible to provide information in response to the request of the user.

Moreover, according to the present invention, the recording position at download recording is controlled in accordance with the information of the recording position pointer which is recognized from the exhibit information when the recording medium is loaded. Thus, download can be made at the recording position in accordance with the circumstances of the side of the recording medium.

Moreover, according to the present invention, when download recording to the recording medium is executed, the value of the recording position pointer information recorded in the recording medium is renewed to a value indicating the recording position when the next download recording is to be executed. Thus, for example, content can be recorded at different positions at each time of download execution, which can prevent the life of a medium from shortening by data rewriting carried out at only the same portion on the recording medium.

Moreover, according to the present invention, the determination of whether it is suitable to perform a download operation to the recording medium is carried out in accordance with the information of the download times recognized from the exhibit information when the recording medium is loaded. That is, it is possible to determine whether or not the reliability of the medium is lowered since download has been repeated a large number of times. By carrying out required processing in accordance with the result of the determination, the processing responding to lowering of reliability (for example, exchange of medium) becomes possible. By this, the reliability of the information providing apparatus system can also be improved.

Moreover, according to the present invention, the value of the number of download times recorded in the recording medium is renewed to be incremented each time download recording is executed to the recording medium, so that the reliability of the recording medium can be accurately determined.

Moreover, according to the present invention, as a result of confirmation of the information of the download times, in the case where it is determined to be unsuitable to carry out a download operation, a request is made to obtain the user's instruction as to whether download should be made. Thus, proper processing based on the intention of the user can be executed especially for the recording medium owned by the user.

Moreover, according to the present invention, in the case where the user desires to download the content to the user's own recording medium, a download operation mode can be selected. For example, it becomes possible to determine whether the past content data are held or not, to select the content with hierarchy, and so on. That is, it is possible to realize content provision to meet the needs of each user.

Moreover, according to the present invention, the information providing apparatus can take in the download data through communication, and can use it for provision to the user. Thus, it is possible to quickly and easily execute preparation of content supplied to a general user, for example, renewal of content of an electronic newspaper or the like, acquiring of new content, and so on. Thus, it becomes also possible to always prepare the newest information and the content which many users desire to purchase.

Moreover, according to the present invention, download data are stored, so that download can be always executed, and data received from the server can be held as the download data.

Moreover, according to the present invention, since charging processing is made in accordance with the download data (content), proper and flexible fee setting becomes possible when the information providing apparatus is used.

Moreover, according to the present invention, the recording medium is provided with exhibit information which enables discrimination of whether it is a personal medium which can be used by only the owner, or a common medium which is used by many unspecified people. Thus, in the information providing apparatus in which the recording medium is loaded, suitable processing becomes possible in accordance with the kind of the recording medium.

Moreover, according to the present invention, the recording medium is provided with exhibit information which can indicate specific download data in addition to indication of the recording medium. Thus, in the information providing apparatus in which the recording medium is loaded, even if operation input is not made, the content requested to be downloaded can be recognized and the operation processing can be quickly made.

Moreover, according to the present invention, the recording medium itself is provided with a function to output the download data, in addition to the indication of the recording medium. Thus, when the user merely receives the recording medium through the information providing apparatus, even if the user does not have a reproducing apparatus or the like, the obtained content can be confirmed which becomes very convenient.

What is claimed is:

1. An information providing apparatus, comprising:

a loading section in which a recording medium including use state identification information indicating one of a personal use and an unspecified user's use is removably loaded;

recording means for recording content information in said recording medium loaded in said loading section;

use state detecting means for detecting which of said personal use and said unspecified user's use said use state identification information of said recording medium loaded in said loading section indicates;

ejecting means for ejecting said recording medium to an outside of said apparatus;

content detecting means for detecting a kind of content information to be recorded in said recording medium ejected by said ejecting means;

a housing section capable of housing a recording medium in which one of various kinds of content information is recorded in advance; and control means, wherein when said use state detecting means detects that said use state identification information of said recording medium indicates said personal use, said control means controls said recording means so that said content information of the kind detected by said content detecting means is recorded in said recording medium loaded in said loading section, and then, said control means controls said ejecting means so that said recording medium loaded in said loading section is ejected, and when said use state detecting means detects that said use state identification information of said recording medium indicates said unspecified user's use, said control means controls said ejecting means so that said recording medium in which said content information of the kind detected by said content detecting means is recorded is ejected among recording media housed in said housing section.

2. An information providing apparatus according to claim 1, wherein said recording medium includes content identification information indicating the kind of said content information; and said content detecting means detects the kind of said content information to be recorded in said recording medium ejected by said ejecting means on the basis of said content identification information of said recording medium loaded in said loading section.

3. An information providing apparatus according to claim 1, further comprising:

recording times detecting means for detecting the number of recording times of content information in said recording medium loaded in said loading section; and discarding means for discarding said recording medium loaded in said loading section when said recording times detecting means detects that the number is a predetermined number of times or more.

4. An information providing apparatus according to claim 1, further comprising:

recording times detecting means for detecting the number of recording times of content information in said recording medium loaded in said loading section; and warning means for warning a user when said recording times detecting means detects that the number is a predetermined number of times or more.

5. An information providing apparatus according to claim 1, further comprising charging means for carrying out a charging processing prior to ejection of said recording medium by said ejecting means.

6. An information providing apparatus according to claim 5, wherein said charging means carries out said charging processing at a fee determined according to the kind of said content information detected by said content detecting means.

7. An information providing apparatus according to claim 1, further comprising recording position detecting means for detecting recording position information indicating a recording position of said content information from said recording medium;

wherein said control means records said content information at said recording position based on said recording position information of said recording medium, and controls said recording means so that new record position information is recorded in said recording medium.

8. A information providing apparatus according to claim 1, further comprising communication means for communicating with an outer server;

wherein said recording means records content information received by said communication means from said outer server in said recording medium.

9. A method of providing a content, comprising the steps of:

detecting which of a personal use and an unspecified user's use is indicated by use state identification information of a recording medium loaded in a loading section;

detecting a kind of content information to be recorded in a recording medium which will be ejected by ejecting means;

when it is detected in said step of detecting a use state that said use state identification information of said recording medium indicates said personal use, recording the content information of the kind detected in said step of detecting the kind of the content information in said recording medium loaded in said loading section, and then, controlling said ejecting means so that said recording medium loaded in said loading section is ejected, and when it is detected in said step of detecting the use state that said use state identification information of said recording medium indicates said unspecified user's use, controlling said ejecting means so that, among recording media housed in a housing section capable of housing recording media in which any one of various kinds of content information is recorded in advance, one of the recording media in which the content information of the same kind as the kind detected in said step of detecting the kind of the content information is recorded, is ejected.

* * * * *